United States Patent
Roberts et al.

(10) Patent No.: US 7,366,388 B2
(45) Date of Patent: Apr. 29, 2008

(54) HOLLOW-CORE OPTICAL FIBER AND METHOD OF MAKING SAME

(75) Inventors: John Roberts, Combe Down (GB); Hendrik Sabert, Stelle (DE); Brian Joseph Mangan, Bath (GB); Lance Farr, Hereford (GB)

(73) Assignee: Crystal Fibre A/S, Birkerod (DK)

( * ) Notice: Subject to any disclaimer, the term of this patent is extended or adjusted under 35 U.S.C. 154(b) by 137 days.

(21) Appl. No.: 11/061,892

(22) Filed: Feb. 22, 2005

(65) Prior Publication Data

US 2005/0185908 A1    Aug. 25, 2005

(30) Foreign Application Priority Data

Feb. 20, 2004    (GB)    ............... 0403901.2

(51) Int. Cl.
*G02B 6/36* (2006.01)
*C03B 37/01* (2006.01)

(52) U.S. Cl. .............. 385/125; 65/393; 65/426

(58) Field of Classification Search ............. 385/125; 65/393, 426
See application file for complete search history.

(56) References Cited

U.S. PATENT DOCUMENTS

| | | | |
|---|---|---|---|
| 6,539,155 B1 | 3/2003 | Broeng et al. | |
| 6,788,865 B2* | 9/2004 | Kawanishi et al. | ......... 385/125 |
| 2003/0230118 A1 | 12/2003 | Dawes et al. | |
| 2004/0114895 A1* | 6/2004 | Okazaki et al. | ............. 385/123 |

FOREIGN PATENT DOCUMENTS

| | | |
|---|---|---|
| GB | 2 408 812 A | 6/2005 |
| WO | 00/60388 A1 | 10/2000 |
| WO | 02/059656 A2 | 8/2002 |
| WO | 02/084347 | 10/2002 |
| WO | 02/101429 | 12/2002 |
| WO | 03/080524 A1 | 10/2003 |
| WO | 04/001461 | 12/2003 |
| WO | 2004/046054 | 6/2004 |
| WO | 2004/057392 A1 | 7/2004 |
| WO | 2004/057393 A1 | 7/2004 |

(Continued)

OTHER PUBLICATIONS

Birks et al., "Full 2-D photonic bandgaps in silica/air structures", Electronics Letters, Oct. 26, 1995, vol. 31, No. 22, pp. 1941-1942.

(Continued)

*Primary Examiner*—Michelle R. Connelly-Cushwa
*Assistant Examiner*—Jerry T. Rahll
(74) *Attorney, Agent, or Firm*—Buchanan Ingersoll & Rooney, PC

(57) ABSTRACT

An optical fiber having a cladding region surrounding a core region having an elongate core hole, the inner or outer surface of the core hole having a surface roughness with a spatial period equal to or less than 5 μm by a spectral power below 0.0017 $nm^2$ $\mu m^{-1}$. A method of making an optical fiber including a cladding region having an arrangement of elongate cladding holes in a matrix material, surrounding an elongate core region having an elongate core hole, the method including the step of increasing the surface tension of the matrix material prior to or during the step of heating and drawing the fiber.

5 Claims, 19 Drawing Sheets

FOREIGN PATENT DOCUMENTS

WO  2004/083919 A1  9/2004

OTHER PUBLICATIONS

D.C. Allan et al., "Photonic Crystal Fibres: Effective Index and Band-Gap Guidance", pp. 305-320 in "Photonic Crystal and Light Localization in the 21$^{st}$ Century", C.M. Soukoulis (ed.), © 2001 Kluwer Academic Publishers.

N. Venkataraman et al., ECOC 2002, "Low Loss (13dB) Air core defect Photonic Bandgap Fibre", paper PD1.1.

Charlene M. Smith et al., "Low-loss hollow-core silica/air photonic bandgap fibre", Nature, vol. 424 (2003), p. 657-659.

J. Jäckle et al. "Intrinsic roughness of glass surfaces", Journal of Physics: Condensed Matter 7 (1995) pp. 4351-4358.

Bredol et al., "Improved Model for OH Absorption in Optical Fibers", Journal of Lightwave Technology, vol. 8, No. 10, Oct. 1990, pp. 1536-1540.

A. Kucuk et al., "Influence of various atmospheres on the surface properties of silicate melts", Glastechnische Berichte: Glass Sci. & Technol., vol. 73 (2000) No. 5, pp. 123-129.

A. Kucuk et al., "An estimation of the surface tension for silicate glass melts at 1400° C. using statistical analysis", Glass Technology, vol. 40, Oct. 5, 1999, pp. 149-153.

Litchinitser et al., "Antiresonant reflecting photonic crystal optical waveguides" Optics Letter, vol. 27 No. 18, Sep. 15, 2002, pp. 1592-1594.

* cited by examiner

10μm

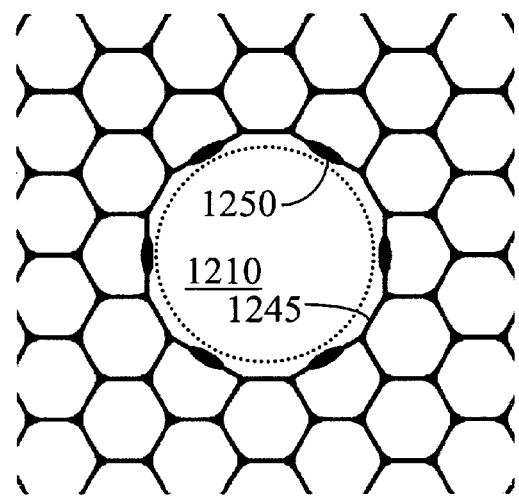
Figure 12a
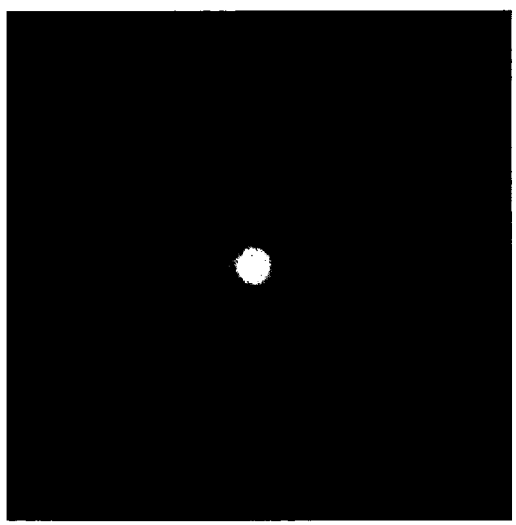 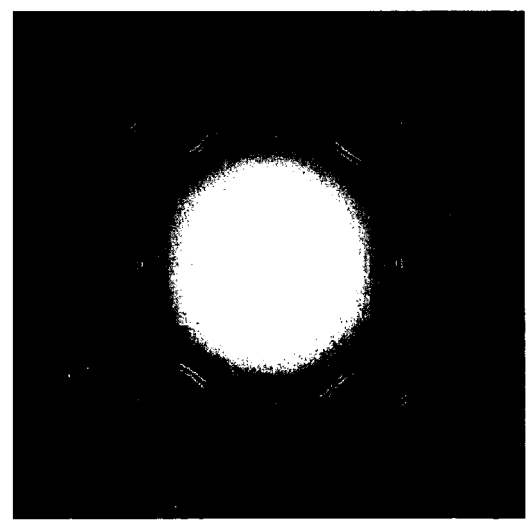
Figure 12b  Figure 12c

HOLLOW-CORE OPTICAL FIBER AND METHOD OF MAKING SAME

CROSS-REFERENCE TO RELATED APPLICATIONS

The present application claims the priority of GB 0403901.2, filed on Feb. 20, 2004, the entire contents of which are incorporated herein by reference.

BACKGROUND OF THE INVENTION

1. Field of the Invention

This invention relates to the field of hollow-core optical fibers, and in particular to the type of fiber known in the art as photonic crystal fiber (PCF), microstructured fiber or holey fiber.

2. Description of Related Art

Hollow core optical fiber waveguides, which are able to guide light by virtue of a so-called photonic bandgap (PBG), were first considered in 1995.

In, for example, "Full 2-D photonic bandgaps in silica/air structures", Birks et al., Electronics Letters, 26 Oct. 1995, Vol. 31, No. 22, pp.1941-1942, it was proposed that a PBG may be created in an optical fiber by providing a dielectric cladding structure, which has a refractive index that varies periodically between high and low index regions, and a core defect in the cladding structure in the form of a hollow core. In the proposed cladding structure, periodicity was provided by an array of air holes that extended through a silica glass matrix material to provide a PBG structure through which certain wavelengths of light could not pass. It was proposed that light coupled into the hollow core defect would be unable to escape into the cladding due to the PBG and, thus, the light would remain localised in the core defect.

It was appreciated that light travelling through a hollow core defect, for example filled with air or even under vacuum, would suffer significantly less from undesirable effects, such as non-linearity and loss, compared with light travelling through a solid silica or doped silica fiber core. As such, it was appreciated that a PBG fiber may find application as a transmission fiber to transmit light between a transmitter and a receiver over extremely long distances, for example under the Atlantic Ocean, without undergoing signal amplification or regeneration, or as a high optical power delivery waveguide. In contrast, for standard index-guiding, single mode optical fiber, signal regeneration is typically required approximately every 50-80 kilometers.

The first PBG fibers that were attempted by the inventors had a periodic cladding structure formed by a triangular lattice of circular air holes embedded in a solid silica matrix surrounding a central air core defect. Such fibers were formed by stacking circular or hexagonal capillary tubes, incorporating a core defect into the cladding by omitting a single, central capillary of the stack, and then heating and drawing the stack, in a one or two step fiber-drawing process, to form a fiber having the required structure.

International patent application PCT/GB00/01249 (The Secretary of State for Defence, UK), filed on 21 Mar. 2000, proposed the first PBG fiber to have a so-called seven-cell core defect, surrounded by a cladding comprising a triangular lattice of air holes embedded in an all-silica matrix. The core defect was formed by omitting an inner capillary and, in addition, the six capillaries surrounding the inner capillary. This fiber structure was seen to guide one or two modes in the core defect, in contrast to the previous, single-cell core defect fiber, which appeared not to support any guided modes in the core defect.

A preferred fiber in PCT/GB00/01249 was described as having a core defect diameter of around 15 μm and an air-filling fraction (AFF)—that is, the proportion by volume of air in the cladding—of greater than 15% and, preferably, greater than 30%. Herein, AFF, or any equivalent measure, is intended to mean the fraction by volume of air in a microstructured, or holey, portion of the cladding, which is representative of a perfect, unbounded cladding. That is, imperfect regions of the cladding, for example near to or abutting the core defect and at the outer periphery of the microstructured region, would not be used in calculating the AFF. Likewise, a calculation of AFF does not take into account over-cladding or jacketing layers, which typically surround the microstructured region.

In the chapter entitled "Photonic Crystal Fibers: Effective Index and Band-Gap Guidance" from the book "Photonic Crystal and Light Localization in the 21st Century", C. M. Soukoulis (ed.), ©2001 Kluwer Academic Publishers, the authors presented further analysis of PBG fibers based primarily on a seven-cell core defect fiber. The optical fiber was fabricated by stacking and drawing hexagonal silica capillary tubes. The authors suggested that there are many parameters that can have a considerable influence on the performance of bandgap fibers: choice of cladding lattice, lattice spacing, index filling fraction, choice of materials, size and shape of core defect, and structural uniformity along the length of the fiber.

In a Post-deadline paper presented at ECOC 2002, "Low Loss (13 dB) Air core defect Photonic Bandgap Fiber", paper PD1.1, N. Venkataraman et al. reported a PBG fiber, having a seven-cell core defect, which exhibited loss as low as 13 dB/km at 1500 nm over a fiber length of one hundred meters. This loss level was, reportedly, an improvement of two orders of magnitude over previously published results. Although the fiber closely resembled the fiber described in the aforementioned book chapter, the authors of this paper attributed the reduced loss of the fiber as being due to the high degree of structural uniformity along the length of the fiber.

Charlene M. Smith et al describe in Nature, Vol. 424 (2003) at page 657 an air-guiding photonic crystal fiber exhibiting a loss of 30 dB/km between 1500 nm and 1700 nm, with a loss of 13 dB/km at 1500 nm. They identify coupling between the so-called surface and air-guided core modes of the fiber as an important contributor to transmission loss in a hollow core fiber. The surface modes are associated with the boundary of the air core and reside near to the silica/air interface. It was noted that reduced transmission occurred where the surface and core modes had the same propagation constant, at which point the spatial overlap provided an avenue by which the surface modes acted as intermediaries to couple light out of the core and into the quasi-continuum of lossy cladding and radiation modes.

The best commercially available, index-guiding telecommunications fiber, hereafter simply referred to as "standard fiber", has a loss typically of the order of 0.16 dB/km. Thus, even the lowest loss levels of reported hollow-core PCF (hereafter referred to as "HC-PCF") are still about two orders of magnitude higher than the loss levels of standard fiber. This degree of loss in HC-PCF clearly represents a problem in, for example, telecoms applications, which often involve propagation of pulses over very long distances. Loss levels can also be a significant consideration in fiber applications other than long-haul telecommunications.

It is generally recognized in the prior art that for a given design of HC-PCF it should be possible to reduce losses by careful fiber fabrication, with special care being taken to achieve structural homogeneity along the length of the fiber. We have found that pressurisation of some or all of the holes of the fiber, for example as described in our International Patent Application No. PCT/GB03/01298 (published as WO 03/080524), can be used to achieve improvements in this regard. We have also discovered that the size of the core hole and the shape and size of the region of material surrounding the core hole is significant in reducing loss. In UK patent application no. 0229826.3, we describe how increasing the size of the core hole can improve the amount of light that is guided in air of a HC-PCF. Also, in one example, described below and in our co-pending UK patent application nos. 0306593.5 and 0322024.1, the core boundary is substantially uniform in thickness and its thickness is such that the boundary region acts like a Fabry-Perot interferometer at anti-resonance, excluding light from the material of the boundary. A similar effect, described below and in our co-pending UK patent application nos. 0306606.5 and 0321991.2 can be achieved by providing a thinner core boundary but with thicker regions, or nodules, which are dimensioned to be antiresonant. By excluding light from the solid material forming the core boundary, the light propagates almost completely in the air-core of the fiber and in the surrounding holes. Theory predicts that exclusion of more than 99%, or even 99.9%, of the light from the glass may be attainable. Losses due to Rayleigh scattering of the bulk material of the fiber may, thereby, be greatly reduced.

So far, by careful fiber design, combined with systematic selection of appropriate fiber drawing parameters (for example, draw speed, draw tension, draw temperature and pressurisation of the core and (separately) the cladding holes) we have attained greatly-reduced losses, compared to the prior art; down to a level of around 2 dB/km over lengths of more than 1 km. We predict that we will achieve even lower losses, for example to a level of between 0.5 and 1.0 dB/km by producing fibers having an even higher degree of homogeneity.

However, even when comparatively good structural homogeneity is achieved, and light is substantially excluded from solid parts of the fiber, we have discovered that further loss-mechanisms will still undesirably limit the loss performance of HC-PCF.

OBJECTS AND SUMMARY

An object of the invention is to provide a hollow-core optical fiber that exhibits a level of loss similar to, or better than, the loss level exhibited in standard optical fibers.

According to a first aspect, an embodiment of the present invention comprises an optical fiber having a cladding region surrounding a core region comprising an elongate core hole, the inner and/or outer surface of the core hole having a surface roughness characterized at a spatial wavelength less than or equal to 5 µm by a spectral power below 0.0017 nm$^2$ µm$^{-1}$. The surface roughness may be characterized at a spatial wavelength less than or equal to 10 µm by a spectral power below 0.0035 nm$^2$ µm$^{-1}$. The surface roughness may be characterized at a spatial wavelength less than or equal to 20 µm by a spectral power below 0.007 nm$^2$ µm$^{-1}$.

In some embodiments, all hole surfaces may have one or more of the aforementioned surface roughness characteristics.

An optical fiber according to an embodiment of the present invention typically has an inner cladding region which comprises a matrix material incorporating an arrangement of elongate cladding holes running substantially parallel to the core hole. The holes in the inner cladding region may be of similar general size, shape and/or arrangement. The inwardly-facing surfaces of the innermost holes in the inner cladding region may constitute the outer surfaces of the core hole. There may also be one or more outer cladding regions, at least one of which might include holes of similar, or different, size, shape and/or arrangement. Aspects of the invention may also apply to fiber structures having plural concentric layers of dielectric material, rather than holes, around a core region, as will be described hereinafter.

According to a second aspect, an embodiment of the present invention provides an optical fiber including an inner cladding region, comprising an arrangement of elongate cladding holes in a matrix material, surrounding an elongate core region, comprising an elongate core hole, wherein the core hole has, in its transverse cross section, a ratio of its perimeter length to the circumference of the largest inscribed circle being greater than 1.2 and wherein the fiber has a characteristic cladding hole filling fraction exceeding 0.8. The core hole perimeter length may be the closed perimeter length, in the event that the core is bounded by an unbroken region of matrix material, or an open perimeter length, in the event the core hole is open in some way to the outside of the fiber. For example, a core hole may be 'open' if there is an elongate fissure running along the length of the fiber. Then, the core hole perimeter length could be defined as the perimeter length of the core hole in addition to twice the transverse distance between the core hole and the outer periphery of the fiber and the outer circumference of the fiber.

According to a third aspect, the present invention provides an optical fiber including an inner cladding region, comprising an arrangement of elongate cladding holes in a matrix material, surrounding an elongate core region, comprising an elongate core hole, wherein the perimeters of more than half of an innermost layer of cladding holes, adjacent to the core hole, are significantly longer than the perimeters of at least a majority of the other cladding holes. The holes in the inner cladding region may be of similar general size, shape and/or arrangement. There may also be one or more outer cladding regions, at least one of which might include holes of similar, or different, size, shape and/or arrangement.

In arriving at the present invention, we have discovered that loss in a HC-PCF is likely to be ultimately dominated by scattering or mode coupling (coupling from the air-guided, fundamental modes of the propagating light to other core modes, cladding modes, or directly to the vacuum states) caused by roughness on the inner surfaces of the fibers. The presence of the holes introduces new loss mechanisms to HC-PCF. Surface contaminants on the hole interfaces may lead to absorption or scattering losses directly, or may do so indirectly by acting as centers of formation for microcrystals or for microscopic cracks. Furthermore, the glass/air interfaces have a natural roughness due to the thermodynamics of the glass forming process. Studies we have made of the outer surfaces of standard fiber and the internal (i.e. hole) surfaces of silica HC-PCF, using Atomic Force Microscopy (AFM), have identified that the dominant surface roughness, in absolute magnitude as well as in spectral shape, is consistent with the roughness that would be expected to result from thermally-excited capillary waves on a silica/air interface, at least over length scales from 50 nm to 50 microns (a range limited by the measurement instrument used). The capillary waves form during the fiber drawing process and become frozen-in at the glass transition temperature.

The capillary waves appear to be in thermal equilibrium during the freezing-in process. The time constants associated with the capillary wave roughness fluctuations rapidly increase as the transition is neared, and the surface that results after the transition has occurred can be considered simply as a snapshot of the surface that exists on a molten surface just above the glass transition temperature. For a more detailed analysis, see, for example, "Intrinsic roughness of glass surfaces", Journal of Physics: Condensed Matter 7 (1995), pp 4351-4358. In this paper, the spectrum of the surface fluctuations has been calculated for a surface on bulk glass, but the theory needs to be adapted for the more complex HC-PCF geometry, which contains a multitude of small, closely spaced air holes.

Despite the increase in the material stiffness associated with glass formation, the dynamics and energy balance associated with the glass transition unfortunately do not lead to a reduction of the amplitude of the capillary wave roughness. On the aforementioned length scales at least, capillary waves fully explain—within the margin of uncertainty of the experiment—our observed magnitude of roughness for a surface tension of about 1 J/m$^2$ (surface tension is the dominant restoring force for such surface capillary waves), which is within the range expected for high purity silica.

While we suggest that the aforementioned surface roughness is likely to be dominated by frozen-in, thermally-excited capillary waves, we acknowledge that contributions to the roughness may come from other thermally-excited waves, or indeed other unidentified sources, which happen to have the requisite characteristics to cause the identified roughness characteristics. For the sake of simplicity of description herein, however, roughness that generally has the magnitude and spectral characteristics that would be expected to result from frozen-in, surface capillary waves, will be referred to simply as "capillary wave roughness".

The fact that the capillary wave roughness appears to be a result of a thermal equilibrium process implies that it can not be reduced simply by changing the conditions during the fiber draw. For example, pulling the fiber at high speed and at high tension is found to make no appreciable difference to the resultant capillary wave roughness characteristics. Thus, we have identified the following three options (which may, of course, be implemented singularly or in combination) for reducing the effects of capillary wave roughness on mode propagation:

(1) Designing a fiber such that the mode coupling loss induced by a given level of capillary wave roughness is minimized. This involves ensuring that as little light as possible of the guided mode of interest exists at the air-glass interfaces. The nature of the capillary wave roughness spectrum also implies that increasing the propagation constant ($\beta$) separation between a guided mode of interest and all other modes is beneficial. Detailed computation of the mode-coupling coefficients also shows that other modal properties, in particular related to symmetry, can also affect the resultant mode coupling loss;

(2) Reducing the amplitude of the capillary wave roughness by increasing the surface tension of the glass material being used. As described below, the amplitude of the spectrum is proportional to $T_{gl}/\sigma$, where $T_{gl}$ is the glass transition temperature and $\sigma$ is the surface tension (which remains essentially constant at the glass transition). For a given glass material, there is little scope for significantly altering $T_{gl}$, but the surface tension can be increased, for example, by increasing the purity of the glass or, for some glasses, adding certain compounds;

(3) Decreasing the capillary wave roughness by design of the geometry. We have shown that the roughness spectrum is affected by the geometry of the holes. In particular, the perimeter lengths of the core hole boundary (the continuous glass element that encloses the air core) and of the holes that adjoin the core boundary are found to significantly alter the part of the power spectrum of the capillary wave roughness which is responsible for most of the loss. A longer perimeter length reduces the strength of the most detrimental spectral components of the roughness.

The first of these three options, which reduces the affect of capillary wave roughness on loss, has to an extent already been explored in our co-pending patent applications GB0306606.5 and GB0306593.5 (both filed on 21 Mar. 2003), which involve use of an anti-resonant core boundary to minimize the amount of light at the air/glass interface and in the core boundary itself, and in GB0328014.6 (filed on 03 Dec. 2003), which considers shifting the operating point for a given HC-PCF to a longer wavelength, in order to take advantage of decreased loss due to interface roughness scattering (which outweighs the accompanying increase in intrinsic loss due to multi-phonon absorption in the bulk of the material, since only a small portion of the field resides in the glass). The second and third alternatives, which are also briefly discussed in GB0328014.6, are effective methods for decreasing capillary wave roughness and will be described in significant detail hereinafter.

It is well known that decreasing the concentration of $OH^-$ ions in silicate glasses is beneficial for reducing loss in standard, solid core optical fibers, made from the glasses, which are designed to operate at around 1300 nm or 1550 nm; see, for example, "Improved Model for OH Absorption in Optical Fibers", Bredol et al, Journal of Lightwave Technology, vol. 8, no. 10, October 1990, pp1536-1540. Accordingly, glass used in making such optical fibers is typically treated to reduce the deleterious effects of the OH species, for example by exposing the glass to a Chlorine atmosphere, which in effect can remove a significant proportion of the OH. In addition, the glass is drawn into a fiber in a dry atmosphere, free of water vapour, to avoid OH contamination of the resulting fibers. While it is important to remove OH from glass used to manufacture standard optical fibers, a common perception may be that it is not as crucial to remove OH from the glass used in HC-PCF manufacture, since a key advantage of HC-PCF is that most of the light can be guided in air rather than in glass.

It is also known that the surface tension of silicate glasses is reduced by OH contamination. See, for example, "Influence of various atmospheres on the surface tension properties of silicate melts", Kucuk et al., Glastech. Ber. Glass Sci. Technol. 73 (2000) No. 5. This paper concentrates in particular on soda-lime-glass, E-glass, a TV-panel glass and a soft borosilicate glass and is not concerned with optical fibers, or their associated glasses, as such.

Considering the second option again, having identified that a significant proportion of loss in HC-PCF is due to surface capillary waves and that surface capillary waves are reduced by increasing the surface tension of the glass used to make the fibers, the present inventors have now appreciated that removal of OH from the glass used to make HC-PCF is far more important than may otherwise have been thought.

In addition to increasing surface tension by dehydrating glass used in HC-PCF manufacture, the present inventors propose that surface tension in glass used for making HC-PCF can be increased by altering the composition of the glass. In, for example, "An estimation of the surface tension for silicate glass melts at 1400° C. using statistical analysis", Glass Technology, vol. 40, no. 5, October 1999, Kucuk et al. identify that surface tension in silicate glass varies in accord with the following formula:

$$\gamma(mN/m) = 271.2 + 1.48 \text{ mol \% } Li_2O -$$
$$2.22 \text{ mol \% } K_2O - 3.43 \text{ mol \% } Rb_2O + 1.96 \text{ mol \% } MgO +$$
$$3.34 \text{ mol \% } CaO + 1.28 \text{ mol \% } BaO + 3.32 \text{ mol \% } SrO +$$
$$2.68 \text{ mol \% } FeO + 2.92 \text{ mol \% } MnO - 1.38 \text{ mol \% } PbO -$$
$$2.86 \text{ mol \% } B_2O_3 + 3.47 \text{ mol \% } Al_2O_3 - 24.5 \text{ mol \% } MoO_3$$

This formula identifies that some metal oxides (such as CaO) have the effect of increasing surface tension in silica and some metal oxides (such as PbO) have the effect of reducing surface tension in silica. The paper describes various methods for measuring the surface tension of glass that could be used to test glasses having different compositions. For example, it would be expected from the formula that adding about 10 mol % $Al_2O_3$ to pure silica would increase the surface tension of the glass by about 13%.

Additionally, adding compounds to silica is expected to reduce the glass transition temperature $T_{gl}$. Most preferably, therefore, the surface tension of the glass is increased and the transition temperature is reduced, compared to pure silica, by adding appropriate compounds to the silica. In any event, it is also preferable not to significantly increase bulk loss by varying the composition of the glass. Certainly, adding some compounds, such as FeO, would have this deleterious effect despite having the potential for increasing surface tension, while adding other compounds would not. Of course, it is quite possible that a certain degree of increased bulk loss could be compensated for by the accompanying reduced loss due to capillary wave roughness.

Considering the third option again, we have found that the mode density of capillary waves existing at the silica interfaces within a HC-PCF can be controlled by modifying the geometry of the holes. A desirable fiber structure would be one in which no capillary wave roughness exists over length scale ($\beta$) ranges which would otherwise tend to give rise to most of the loss. Unfortunately, we have found that this is unlikely to occur for geometries appropriate for typical, known HC-PCF. However, we have found that it is possible to reduce the amount of capillary wave roughness over length scale ($\beta$) ranges of interest by varying the fiber structure geometry, as will be described hereinafter. In particular, we show that the capillary wave roughness spectrum can be significantly modified from the form appropriate to an infinitely extended interface.

As used herein 'silica' encompasses fused silica, including doped fused silica, and silicate glasses in general such as germano-silicates and boro-silicates. Of course, HC-PCF may be made from an inorganic glass in the category of halide glasses, such as a fluoride glass, for example ZBLAN. Other examples of inorganic glasses that may be used are alumino-fluorides, Tellurites, chalcogenides, phosphide glasses and germanates. Alternatively, a HC-PCF may comprise an organic polymer, instead of an inorganic glass. An advantage of using a polymer may be reduced intrinsic capillary wave roughness.

It should be noted that there are many parameters, such as AFF and cladding pitch (i.e. the shortest hole to hole spacing), that can be altered when designing a HC-PCF. Different combinations of values of those parameters may produce, for example, bandgaps over the same or very similar wavelength ranges. Accordingly, we provide herein various lists of parameter values. It should be understood that all functioning combinations of those (or different) values are within the scope of the invention, except where context, sense, or the limits of physical possibility dictate otherwise.

The perimeters of more than half of an innermost layer of cladding holes, adjacent to the core hole, may be significantly longer than the perimeters of at least a majority of the other cladding holes. The perimeters may be more than 1.2 times the perimeter length of at least a majority of the other cladding holes. The perimeters may be more than 1.4, more than 1.6, more than 1.8 or even more than 2 times the perimeter length of at least a majority of the other cladding holes.

At least one of the cladding holes, having a significantly longer perimeter, may have a generally elongate cross section. For example, the hole or holes may have a stretched, elliptical, oblong or oval appearance.

The longest transverse dimension of the at least one cladding hole may be oriented generally tangentially with respect to the periphery of the core hole.

The innermost layer of cladding holes may comprise a plurality of generally elongate cross section holes arranged generally lengthwise, end-to-end, around the core hole. For example, the innermost layer of cladding holes may comprise six generally elongate cross section holes arranged generally lengthwise, end-to-end, around the core hole.

The cladding holes may be arranged in the transverse cross section to have a substantially periodic pattern. Then, the innermost layer of cladding holes may have a transverse radial thickness substantially equal to the smallest period of the cladding holes.

The core hole may have, in its transverse cross section, a ratio of its perimeter length to the circumference of the largest inscribed circle being greater than 1.2. This ratio may be even greater, for example greater than 1.4, greater than 1.6, or even greater than 1.8.

The core hole may have three or more lobes, which project outwardly away from the center of the core hole and into the cladding region. For example, the core hole may have six, nine or even more lobes.

Between neighbouring lobes, the cladding region may extend inwardly towards the center of the core hole. The inwardly-extending cladding regions may comprise, in the transverse cross section, one elongate cladding hole or more than one elongate cladding hole.

The cladding region may include a core boundary, comprising an unbroken region of matrix material surrounding the core hole.

The core boundary may have a generally constant cross-sectional thickness around the core hole. Alternatively, in the transverse cross section, the core boundary may comprise one or more enlarged regions relative to other regions of the core boundary. The enlarged regions may be referred to as nodules, protrusions, beads, or the like.

The core boundary may be attached to the cladding region at a plurality of discrete points and at least one enlarged region along the core boundary may be spaced apart from all such points. In addition, or alternatively, at least one enlarged region may be such a discrete point.

At least one enlarged region of matrix material may have a form selected to render the region substantially antiresonant at an operating wavelength of the fiber. Indeed, the core boundary may be configured to be substantially antiresonant at an operating wavelength of the fiber. For example, the core boundary may have a cross-sectional thickness, around the core hole, selected to render at least some regions of the core boundary substantially antiresonant at an operating wavelength of the fiber.

At least some of the cladding holes, in an innermost layer of cladding holes, may have a lower degree of roughness on their internal walls than other cladding holes. For example, all cladding holes, in the innermost layer of cladding holes, may have a lower degree of roughness on their internal walls than other cladding holes. In any event, the lower degree of surface roughness may at least in part be due to a lower degree of capillary wave roughness.

The core hole may have a lower degree of roughness on its internal wall than at least some cladding holes.

The matrix material may have been dehydrated to increase its surface tension. Dehydration of, for example, a silicate matrix material may involve exposing the material to Chlorine. In the event, residual chlorine remaining in the silicate after dehydration also causes reduced surface tension, alternative dehydration agents, such as Bromine, may instead be employed. Alternatively, or in addition, the matrix material may include one or more constituents to increase its surface tension. For example, the constituents may be metal oxides. One potential metal oxide is $Al_2O_3$. Alternatively, the constituents may be an oxide of an alkaline earth element (i.e. Magnesium, Strontium, Barium etc).The core hole may be substantially evacuated or filled with a relatively low refractive index material. The material, if present, may be a solid, a liquid or a gas. A solid may be a glass or polymer having a relatively low refractive index than a glass in the cladding. A gas may be air, dry air, Nitrogen, or Argon. Additionally, or alternatively, the cladding holes may be substantially evacuated or filled with a relatively low refractive index material; being a solid, a liquid or a gas.

According to a fourth aspect, an embodiment of the present invention provides a method of making an optical fiber including a cladding region, comprising an arrangement of elongate cladding holes in a matrix material, surrounding an elongate core region, comprising an elongate core hole, the method including the step of increasing the surface tension of the matrix material prior to or during the step of heating and drawing the fiber.

The method may include the step of dehydrating the matrix material in order to increase the surface tension thereof. Additionally, or alternatively, the method may include the step of introducing into the matrix material constituents that increase the surface tension thereof. For example, the constituents may be metal oxides. One potential metal oxide is $Al_2O_3$. Alternatively, the constituents may be an oxide of an alkaline earth element (i.e. Magnesium, Strontium, Barium etc).

According to a fifth aspect, an embodiment of the present invention provides a method for making an optical fiber having improved capillary wave roughness characteristics, the fiber having a hollow core and at least an inner cladding having an arrangement of longitudinal holes running substantially parallel to the core and along the length of the fiber, the method including the steps of:

forming an elongate preform from a body of optically transparent material that has an arrangement of elongate holes corresponding to the core and cladding holes of the desired fiber; and heating and drawing the preform into a fiber, the method including in addition one or more steps from the selection of:

forming in the inner cladding an inner layer of cladding holes, adjacent to the core hole, more than half of which have a transverse hole perimeter that is significantly longer than the perimeters of at least a majority of the other cladding holes;

forming in the inner cladding a core hole, which, in transverse cross section has a ratio of its perimeter length to the circumference of the largest inscribed circle being greater than 1.2 and a characteristic cladding hole filling fraction exceeding 0.8; or increasing the surface tension of at least the material around the core hole and/or at least some of the inner layer of cladding holes.

According to a sixth aspect, an embodiment of the present invention provides an optical fiber comprising a cladding region comprising an arrangement of elongate cladding holes in a matrix material and, surrounded by the cladding region, an elongate core region, comprising a relatively larger core hole, the optical fiber being characterized by any one or more of:

the core hole in its transverse cross section having a ratio of its perimeter length to the circumference of the largest inscribed circle being greater than 1.2 and a characteristic cladding hole filling fraction exceeding 0.8;

the perimeters of more than half of an innermost layer of cladding holes around the core hole being significantly longer than the perimeters of at least a majority of the other cladding holes; and/or at least some of the matrix material having been treated to increase its surface tension.

In general, fibers according to embodiments of the present invention may guide light by virtue of a photonic-bandgap. The light may be guided at a wavelength between 1500 nm and 1600 nm, for example between 1530 nm and 1570 nm. Alternatively, the light may be guided at a wavelength above 1600 nm and below 2500 nm, for example above 1800 and below 2200, or above 1900 and below 2100.

Preferably, the fiber exhibits a loss of less than 20 dB/km, less than 15 dB/km, less than 10 dB/km, less than 7 dB/km, less than 5 dB/km, less than 3 dB/km, less than 2 dB/km or even less than 1 dB/km.

It is also possible to fabricate air core guiding fibers which incorporate two or more solid materials within the cladding which have sufficiently different refractive indices. The constituent materials can be two different glasses which have glass transition temperatures and other mechanical properties which are compatible in a fiber draw process. It is also possible to fabricate air core guiding structures which have glass and polymer or polymer and polymer as the constituent cladding materials. Properly designed, such cladding structures remove the necessity to incorporate small air holes to contain the light. A boundary between the constituent materials, however, is subject to frozen in thermal capillary waves in a manner completely analogous to a glass/air or polymer/air interface. To generalise the surface capillary wave analysis presented herein for fibers with solid material/air within the cladding, it is simply necessary to replace the surface tension a with the difference $\Delta\sigma$ in the surface energies of the constituent materials which have an interface. It is sufficient to use an average of the glass transition temperatures of the constituents as the value for the effective glass transition temperature $T_{gl}$.

The foregoing discussion on capillary wave roughness uses the example of a silica and air HC-PCF. However, it should be appreciated that the issue of capillary wave roughness is not exclusive to silica and air fibers. In the fabrication of two solid material component fibers, there are two competing capillary wave related requirements which need to be satisfied to achieve low loss results. First of all, one requires the surface energy difference between the constituents to be large to ensure the frozen-in thermal interface capillary waves are at a sufficiently low level and ultimately to prevent mixing of the constituents. Secondly, the difference in the surface energies needs to be small enough to prevent capillary wave instability growth occurring during the draw. Such instability also potentially occurs for glass/air or polymer/air systems, but by careful control of the gas pressure applied to the holes during the draw they can be controlled to a level which contributes to the loss below the level of the frozen-in thermal capillary waves. Of course, such control of the instability is far more difficult to achieve for an interface between two non-gaseous components. We suggest that this has constrained the difference in the surface energies $\Delta\sigma$ of the materials to be below around 0.05 $Jm^{-2}$, with a value nearer 0.02 $Jm^{-2}$ being more typical. Although the glass transition temperature for the glasses and polymers typically used in multi-component cladding fibers is low compared to that of silica, the small value of $\Delta\sigma$ results in an increased thermal capillary wave roughness and a corresponding increased loss. The surface roughness scattering loss problem is exacerbated by the fact that the index step between the constituent materials of fabricated air core multi-material fibers is higher. This results in a larger polarisability of the roughness features on the interface and hence increased scattering loss. Furthermore, the intrinsic loss of the materials in prior art multi-material air core fibers, for example as described in published international patent application WO02/059656, is far higher than in glasses such as silica or ZBLAN. This has precluded their use in long distance communications, where low loss effectively single mode operation with tolerance to bends and other perturbations is paramount.

The fiber structures described in WO02/059656 have a different cladding design than the aforementioned HC-PCF fibers. The cladding typically comprises plural concentric layers of different refractive index dielectric materials surrounding the core region, and in effect acts like a dielectric stack to confine light to the core region, which may be hollow or comprise a relatively low refractive index dielectric material. However, we would suggest that increasing surface tension (or surface energy difference at the interfaces between layers) or increasing the interface lengths would find beneficial application in these kinds of fibers with regard to reducing capillary wave roughness.

BRIEF DESCRIPTION OF THE DRAWINGS

Embodiments of the present invention will now be described, by way of example only, with reference to the accompanying drawings, of which:

FIGS. 7a and 7b are respectively diagrams which show the view from above and the view from the side of an apparatus used to measure the angular resolved loss of the fiber shown in FIG. 6a;

FIG. 12a is a diagram of the transverse cross section of a HC-PCF structure having a seven cell core defect, with the addition of a core boundary including antiresonant "beads" or "nodules" at the mid-point along each of the longer boundary veins;

FIGS. 12b and 12c are respectively linear and log mode intensity plots of the fundamental-like mode supported by the HC-PCF structure of FIG. 12a;

FIGS. 13b and 13c are respectively linear and log mode intensity plots of the fundamental-like mode supported by the HC-PCF structure of FIG. 13a;

FIGS. 16a and 16b are diagrams that show in cross section a preform stack, in two different stages of manufacturing, that can be used for making a HC-PCF of the kind illustrated in FIG. 13a;

FIG. 17 is a diagram that shows in cross section an alternative preform stack that can be used for making a HC-PCF of the kind illustrated in FIG. 13a;

FIGS. 18a and 18c are diagrams that show in cross section a preform stack, in two different stages of manufacturing, that can be used for making a HC-PCF of the kind illustrated in FIG. 15a.

DETAILED DESCRIPTION OF THE PREFERRED EMBODIMENTS

Figure 1:
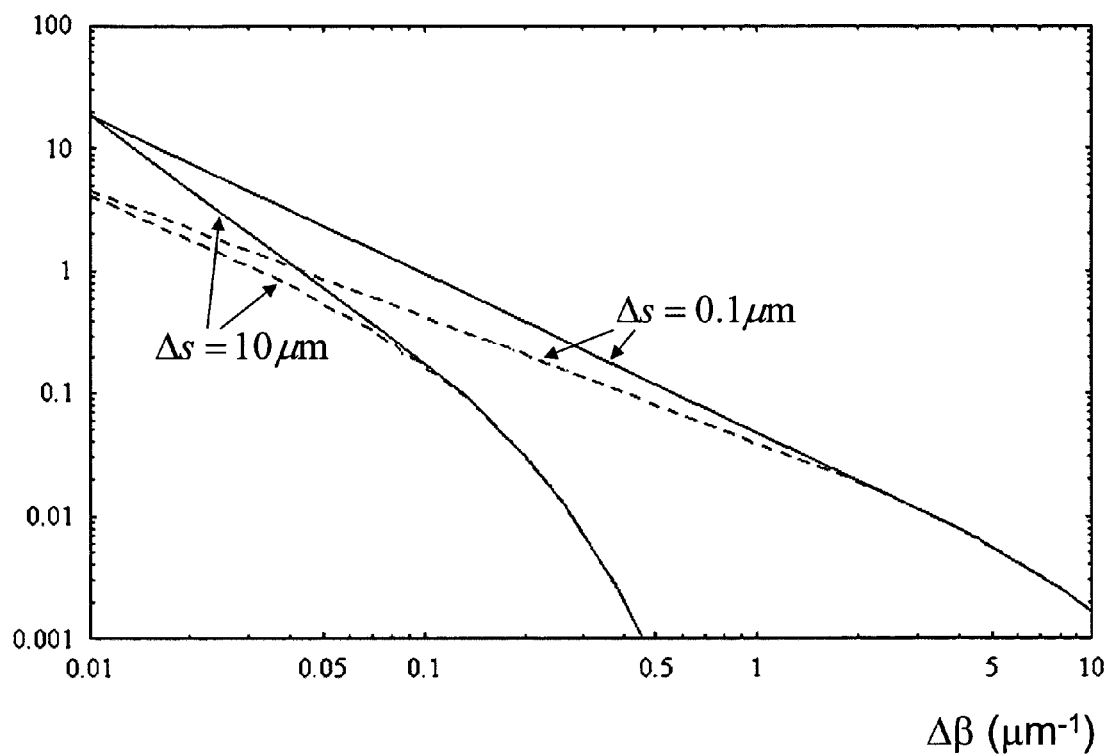
FIG. 1 is a graph which compares the spectrum $\tilde{\Psi}_j(\Delta s; \Delta\beta)$ for a hole with perimeter length $W_j$=50 μm (unbroken lines), plotted against $\Delta\beta$ with the spectrum for a homogeneous infinite interface (broken lines)—corresponding to the limit $W_j \to \infty$,—at perimeter point separations of $\Delta s$=0.1 μm and 10 μm.

As already mentioned, HC-PCF contains a multitude of small, closely spaced air holes together with a relatively large central air hole which defines a guiding core. Detailed calculation of the capillary wave roughness spectrum in such complex geometries is a difficult task, and we have used a simplified analysis to predict the effect of varying fiber geometry. Our simplified analysis is validated by comparing the calculated results with measurements taken from real fibers, as will be described hereinafter.

We find that the mode propagation loss, characterized by an attenuation coefficient $\gamma$, incurred from the surface roughness is given by $$\gamma_1 = \frac{k^3}{4}\left(\frac{\varepsilon_0}{\mu_0}\right)(n_g^2-1)^2 \times \sum_{j=1}^{N_{holes}} \oint_{j'\text{th hole perimeter}} ds \oint_{j'\text{th hole perimeter}} ds' \int d\beta \, \tilde{e}_{1,j}^H(s') \text{Im}[ \quad (1.1)$$

$$G_{2D}(r_j^+(s'), r_j^+(s); k, \beta)] \tilde{e}_{1,j}(s) \tilde{\Psi}_j(s, s'; \beta - \beta_1)$$

where $n_g$ is the refractive index of the glass, $k=2\pi/\lambda$ is the wave number of the light, $\varepsilon_0$ and $\mu_0$ are respectively the permittivity and permeability of the vacuum, $\tilde{e}_{1,j}(s)$ expresses the electric field of the normalized guided mode at the perimeter of the j'th hole interface at a position labelled by a coordinate s, $\beta$ is the propagation constant (the wave vector component along the fiber direction) of the scattered radiation and $\beta_1$ is the propagation constant of the guided mode in question. $G_{2D}(r_j^+(s'), r_j^+(s); k, \beta)$ is an electric field Green's tensor connecting two points just outside the perimeter of the j'th hole. The dependence on the capillary wave roughness is contained solely within the spectral function $\tilde{\Psi}_j(s, s'; \Delta\beta)$, which, for our particular surface capillary wave model (which assumes that the capillary wave roughness on each hole interface is independent of roughness existing at the other hole interfaces and that the capillary wave roughness is in a state of thermal equilibrium at the glass transition where the freezing-in takes place) is given for the j'th hole by $$\tilde{\Psi}_j(s, s'; \Delta\beta) \equiv \tilde{\Psi}_j(\Delta s; \Delta\beta) = \frac{k_B T_{gl}}{\sigma} \frac{1}{W_j} \sum_{m=-\infty}^{\infty} \frac{\exp\{i[k_j^{(m)}\Delta s]\}}{[k_j^{(m)2} + \Delta\beta^2]} \quad (1.2)$$

where $\Delta s = s' - s$, $W_j$ is the perimeter length of the j'th hole and $$k_j^{(m)} = \frac{2\pi}{W_j} m, \quad (m = \text{Integer}) \quad (1.3)$$

is a wave vector component around the hole perimeter, which is quantised due to the closed nature of a hole perimeter. The Boltzman constant has been denoted $k_B$.

On longitudinal (along the fiber axis) length scales much shorter than the hole perimeter length, the summation in equation (1.2) can be replaced by an integral which gives $$\tilde{\Psi}(\Delta s; \Delta\beta) = \frac{k_B T_{gl}}{\sigma} \frac{1}{2|\Delta\beta|} \exp[-|\Delta\beta\Delta s|]. \quad (1.4)$$

The magnitude of the capillary wave roughness is determined primarily by the surface tension $\sigma$ and the glass transition temperature $T_{gl}$, the power spectrum of the surface fluctuations being proportional to $T_{gl}/\sigma$. For a given material, $T_{gl}$ cannot be significantly altered but, as shown herein, the surface tension can be significantly altered. The power spectrum of the capillary wave roughness is affected by the geometry of the holes on length scales of order and longer than the holes' perimeter lengths.

Thus, from (1.4) the fluctuations attain a scale independent (fractal) form. Equation (1.4) is an expression of the capillary wave roughness spectrum on an infinitely extended interface. For longitudinal length scales large compared to the separation $\Delta s$ (so that $|\beta\Delta s|\ll 1$), the spectrum shows a $1/|\Delta\beta|$ dependence.

Equation (1.2) is of the form of a Fourier series around the hole perimeter. Each value of m corresponds to a particular mode of hole perimeter deformation. The m=0 mode corresponds to a "breathing" of the perimeter (that is, a mode in which the perimeter congruently expands and contracts over a defined longitudinal spatial period) and gives rise to a contribution to $\tilde{\Psi}_j(\Delta s;\Delta\beta)$ with a $1/\Delta\beta^2$ dependence. This term dominates the spectrum for small $\Delta\beta$ (longitudinal length scales which are long compared to the hole perimeter length) and the breathing mode is found to contribute to the loss in HC-PCF significantly more than the other capillary wave modes.

FIG. 1 is a graph that compares the spectrum $\tilde{\Psi}_j(\Delta s;\Delta\beta)$ for a hole with perimeter length $W_j$=50 μm (unbroken lines), plotted against $\Delta\beta$ with the spectrum for a homogeneous infinite interface (broken lines)—corresponding to the limit $W_j \to \infty$—at perimeter point separations of $\Delta s$=0.1 μm and 10 μm. By "perimeter length", we mean a length that can be measured from a scanning electron micrograph image, for example of the kind shown in FIG. 6a. In other words, we do not attempt to measure material surface fluctuations, roughness or the like in the measurement. It is seen from the plots that the fluctuations are significantly lower for the infinite surface than for the hole geometry, for longitudinal wave vectors $\Delta\beta$ satisfying $|\Delta\beta\Delta s|<0.1$. The more rapid increase in the power spectrum for the hole with decreasing $\Delta\beta$ is evident ($1/\Delta\beta^2$ as apposed to $1/\Delta\beta$ for the infinite surface).

Figure 2:
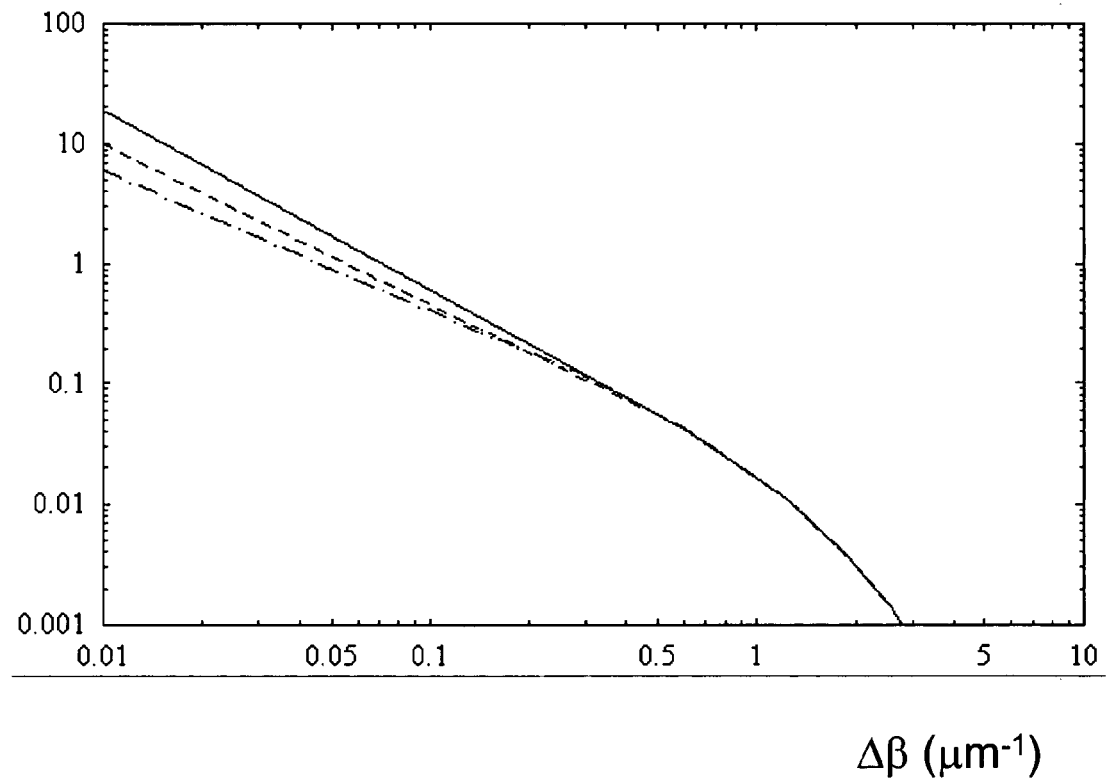
FIG. 2 is a graph which compares the spectrum $\tilde{\Psi}(\Delta s; \Delta\beta)$ for holes with perimeter lengths of 50 μm (unbroken line), 100 μm (dashed line) and 200 μm (dot-dashed line), plotted against $\Delta\beta$ for a perimeter point separation $\Delta s$ of 1 μm.

We have found that the magnitude of the fluctuations due to the breathing mode is weakened if the hole perimeter length is increased. FIG. 2 compares the spectrum $\tilde{\Psi}(\Delta s;\Delta\beta)$ for holes with perimeter lengths of 50 μm (unbroken line), 100 μm (dashed line) and 200 μm (dot-dashed line), plotted against $\Delta\beta$, for a perimeter point separation $\Delta s$ of 1 μm. It is observed that the power of the fluctuations at small $\Delta\beta$ decrease with increasing hole perimeter. In the limit of small $\Delta\beta$, corresponding to large longitudinal length scales, the spectral power becomes proportional to the inverse of the perimeter length, which is characteristic of the breathing mode as can be established from the m=0 term in equation (1.2). As $\Delta\beta$ increases, the spectrum tends towards the infinite surface result. The rapidity of this tendency depends on the hole perimeter length and the perimeter point separation $\Delta s$. The smaller the point separation $\Delta s$, and the smaller the hole size, the larger the $\Delta\beta$ required to converge toward the infinite surface result.

Equation (1.1) involves a double integral over positions around each hole perimeter. It therefore might be thought that larger holes will in fact give rise to an increased contribution to the loss. However, for a well designed fiber, the field $\tilde{e}_{1,j}(s)$ is only appreciable at, and close to, the core boundary. For a given mode area, it is possible to re-design the fiber so that the geometrical perimeter length of the core surround and of the holes that surround it are substantially increased compared to current designs, yet in which the perimeter length over which $\tilde{e}_{1,j}(s)$ is appreciable is relatively unaffected.

Before describing examples of HC-PCF designs according to embodiments of the present invention it is instructive to ascertain by careful measurements the actual nature of roughness on the inner hole surfaces of sample HC-PCF and then determine by experiment which length scales of roughness dominate the loss in fabricated HC-PCF. From this information, it is possible to estimate by how much the loss can be reduced by designing the fiber to have increased hole perimeter lengths.

Figure 3A:
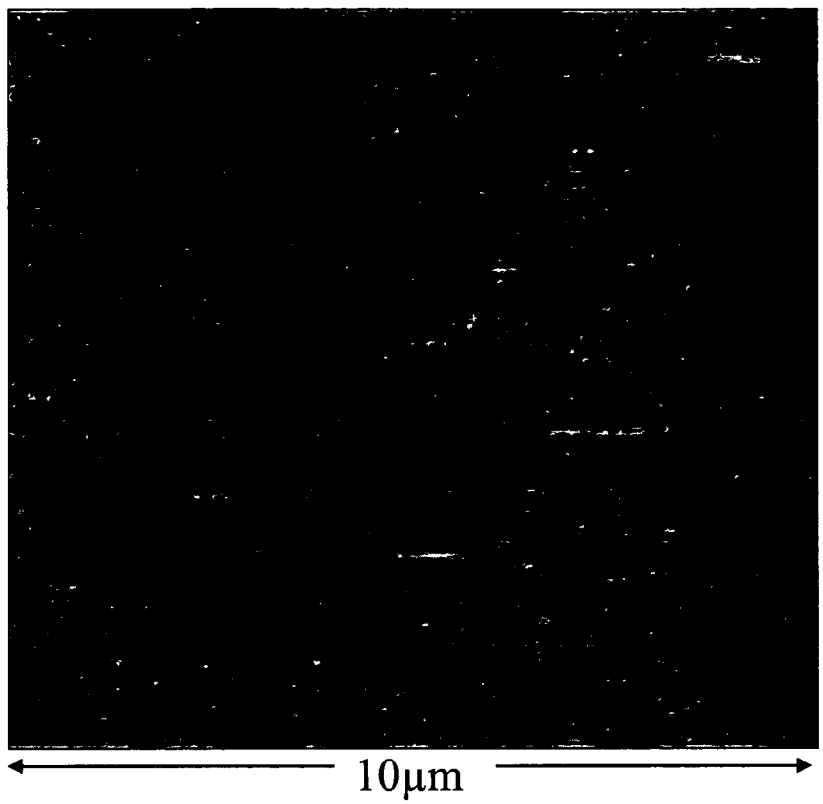
FIGS. 3a and 3b are respectively images of a measured roughness profile of a silica sample and a computed roughness profile for an extended silica surface.
Figure 3B:
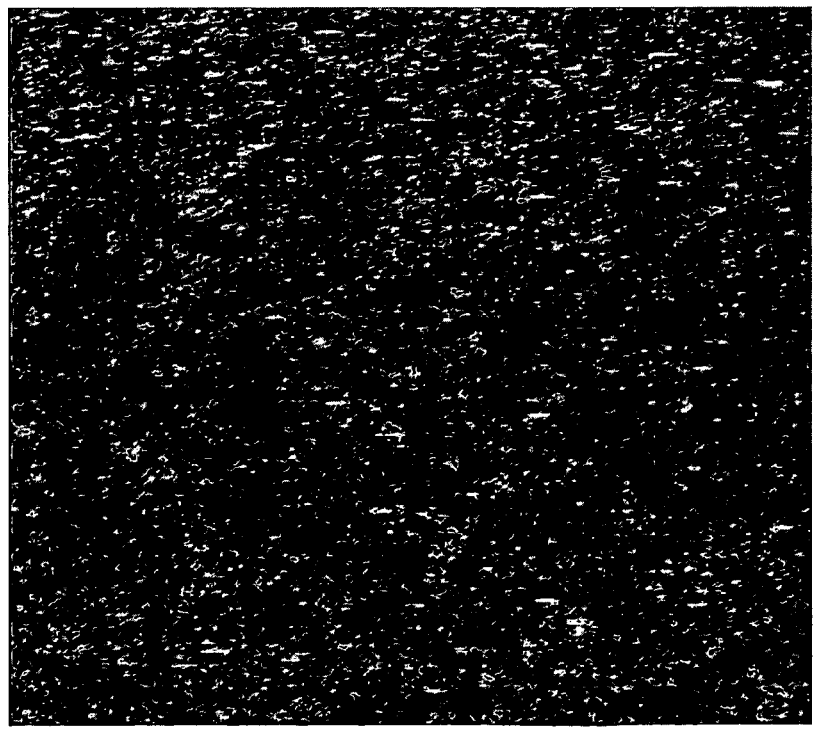

Having theoretically characterized the capillary wave roughness spectrum, we then directly measured the surface roughness spectrum for various materials over a range of length scales using an atomic force microscope (AFM). An AFM is a scanned-proximity probe microscope, which works by measuring a local property—such as height, optical absorption, or magnetism—with a probe or "tip" placed very close to a sample to be measured. The small probe-sample separation (on the order of the instrument's resolution) makes it possible to take measurements at high spatial resolution over a small area. To acquire an image the microscope raster-scans the probe over the sample while measuring the local property in question. The resulting image resembles an image on a television screen in that both consist of many rows or lines of information placed one above the other. One such image of the roughness on the outer surface of a 10 μm square of standard silica, solid core optical fiber is shown in FIG. 3a. The image shown in FIG. 3b is a representative surface roughness profile of silica, which has been generated using our model spectrum. The two images bear a striking resemblance, validating our modelled roughness results, although the measured image is clearly 'softer' due to the high frequency cutoff of the AFM used, which has a value of about 10 μm$^{-1}$.

We obtained surface roughness measurements on an inner wall of a hole of a fabricated silica HC-PCF by crushing a section of the fiber and examining the fragments that resulted. The AFM scanning tip probe was scanned along the longitudinal direction of a cladding hole fragment.

We measured the spectral density $$P_z(\Delta\beta) = \frac{1}{2\pi}\tilde{\Psi}(0, \Delta\beta) \quad (1.5)$$

of the roughness along the axial direction of the hole, which had a radius R=1.5 μm. This was achieved by recording axial linear scans of the height profile $h_p(z)$ over a length L=10 μm at several (N, say) well separated locations (labelled by p) within the hole, and obtaining the spectrum from a DFT approximation to $$P_z(\Delta\beta) = \frac{1}{2\pi L N}\sum_{p=1}^{N}\left|\int_0^L dz\, h_p(z)\exp(i\Delta\beta z)\right|^2 \quad (1.6)$$

Figure 4:
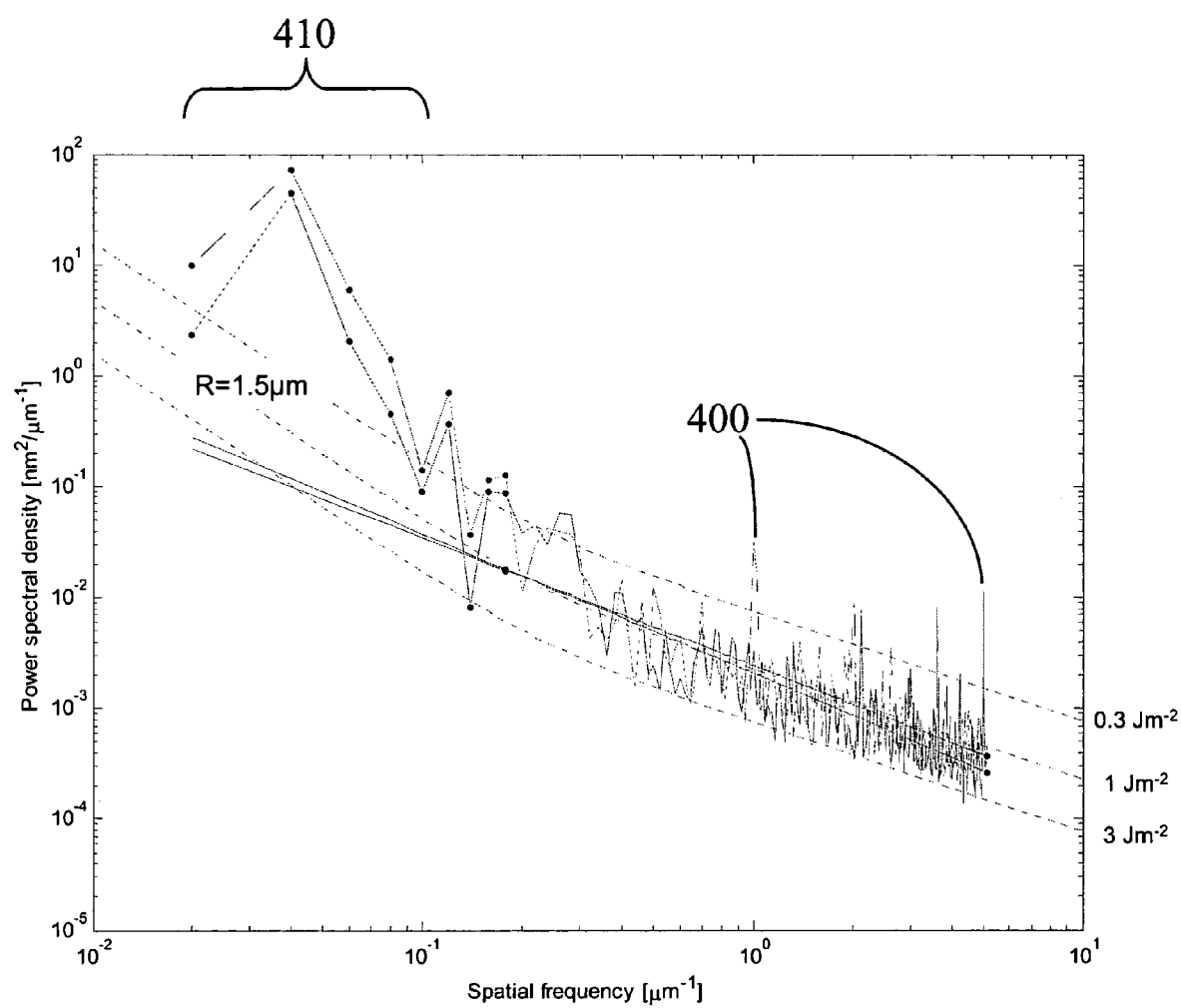
FIG. 4 is a graph which shows the measured characteristic roughness power spectral density for the inside of HC-PCF holes.

The measured roughness spectrum results are plotted on the graph in FIG. 4. The two plotted results are in fact measurements taken over the same sample region in order to validate the integrity of the measurement procedure. The graph in FIG. 4 has a vertical axis of power spectral density in units of nm$^2$/μm$^{-1}$ and a horizontal axis of spatial frequency of the roughness in units of μm$^{-1}$. Both axes are plotted as log scales. Both plots were generated by taking 64 individual traces of roughness at different points on the surface and the results have been carefully adjusted to compensate for the non-linearity of the AFM response. Some of the noise in the traces is due to an incomplete statistical averaging, where it would be expected that smooth curves would be generated from an infinite number of measured samples. The relatively large spikes 400 in the measurements are not representative of the roughness spectrum but are, instead, due to electrical noise at particular temporal frequencies. The accuracy at the first few low spatial frequency points 410 of the trace is compromised due to the cutoff of the AFM probe.

Along the hole axis direction, the surface roughness power spectrum $P_z(\Delta\beta)$ is determined using equation (1.5) together with equation (1.2) evaluated at □s=0. The summation can be analytically performed to yield the axial spectrum $$P_z(\Delta\beta) = \frac{k_B T_{gl}}{4\pi\sigma}\frac{1}{\Delta\beta}\coth(\Delta\beta W/2) \quad (1.7)$$

with W, the perimeter length of the measured hole, being approximately 9.4 □m. For longitudinal length scales much shorter than W, so that $\Delta\beta W \gg 1$, this form reduces to the infinite 2-dimensional interface result given in "Intrinsic roughness of glass surfaces", Journal of Physics: Condensed Matter 7 (1995), pp 4351-4358). However, for $\Delta\beta W \ll 1$, a $1/\Delta\beta^2$ dependence results which is the signature of the aforementioned breathing mode contribution to surface roughness.

The glass transition temperature $T_{gl}$ of silica is relatively insensitive to the presence of an interface and its contaminants, being at a value close to 2000 Kelvin. The surface tension value σ, however, shows far more dependence on interface contamination even at low concentrations. It is for this reason difficult to predict accurately the surface tension of any given material, which will typically include a certain degree of contamination.

The three dotted lines plotted on the graph in FIG. 4 are the theoretical surface capillary wave power spectra given by equation (1.7) for a hole with a perimeter W=9.4 μm at three values of the surface tension: σ=0.3 Jm$^{-2}$, 1.0 Jm$^{-2}$ and 3.0 Jm$^{-2}$. It is seen that the measured roughness spectra fit the capillary wave spectrum given in equation 1.7 for a surface tension of about 1 Jm$^{-2}$ over about two orders of magnitude in the spatial length scale. An independent experimental measurement of the surface tension, obtained by finding the gas pressure which balances the surface tension force during the drawing of a silica capillary tube, agrees with this figure for the σ to within the experimental uncertainty.

Despite the experimental uncertainties in the smaller spatial frequency components to the measured spectrum, the data gives a strong indication that the power spectrum does indeed rise more steeply at shorter spatial frequencies than at longer ones on the log-log plot of FIG. 4; an affect that is ascribed to the geometrical dependence of the spectrum and encapsulated by equation (1.7). In other words, the geometry of the fiber is seen to have a marked affect on the power spectrum at smaller spatial frequencies, but not at larger spatial frequencies, and we have predicted—as well as shown experimentally (as discussed below)—that loss caused by capillary wave roughness is more significant at those smaller spectral frequencies. That the geometry has a significant impact on the power spectrum at shorter spatial frequencies is further supported by the following roughness measurements taken from standard optical fibers.

Figure 5:
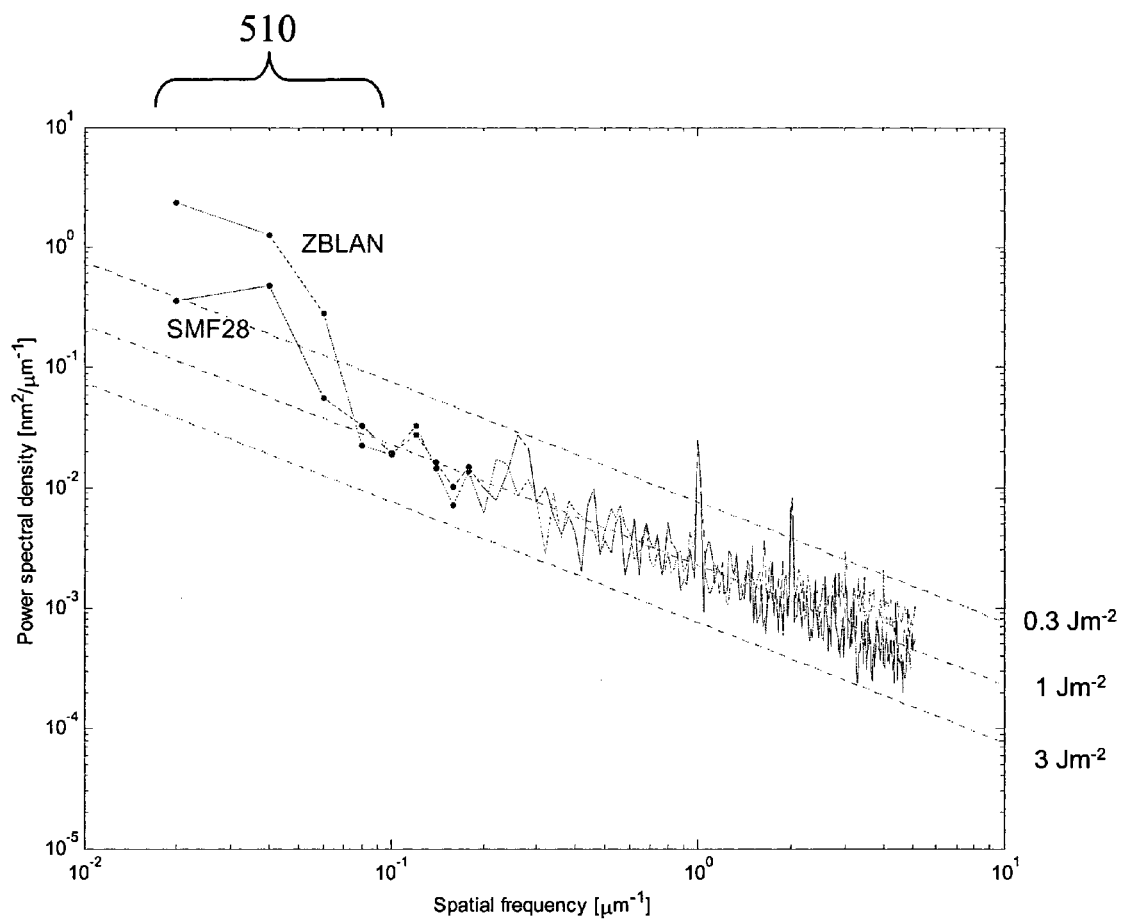
FIG. 5 is a graph which shows the measured characteristic roughness power spectral density for the outer surfaces of a standard fiber sample and a ZBLAN fiber sample.

We have measured the roughness on the outside surfaces of a standard fiber (SMF-28™) and a ZBLAN fiber, both stripped of their protective polymer coatings. Obviously, an outer surface is far easier to measure than inside small holes of the HC-PCF sample. The graph in FIG. 5, which has the same axes as the graph in FIG. 4, shows the resulting AFM measurements of the roughness spectra on the surfaces of both fiber samples. Again, the accuracy at the first few low spatial frequency points 510 of the trace is compromised due to the cutoff of the AFM probe. The dotted lines represent the predicted capillary wave spectra for an infinite interface evaluated for the glass transition temperature appropriate to silica (which is approximately 2000K) and surface tension values of 0.3 $Jm^{-2}$, 1.0 $Jm^{-2}$ and 3.0 $Jm^{-2}$. Obviously, the spectra do not apply to the ZBLAN sample, due to its far lower transition temperature. It is seen that the measured roughness spectrum for the silica surface is again consistent with the capillary wave spectrum for a surface tension value of about 1.0 $Jm^{-2}$. The roughness spectrum of the ZBLAN surface is very similar to that of the silica one. Given that the glass temperature of ZBLAN is about 540K, this suggests that the surface tension value for the ZBLAN sample is a little under 0.3 $Jm^{-2}$.

Water contamination at the silica surfaces is known to significantly reduce the surface tension. Indeed, for surfaces produced in a standard atmosphere without care to reduce water content, the surface tension of molten silica at about 2000K attains a value of around 0.3 $Jm^{-2}$, because the surfaces are rapidly covered with silanol groups (SiOH) after formation (see, for example, the text book "Handbook of Glass Properties", Bansal & Doremus, Academic Press. Inc., 1986 ISBN 0-12-078140-9). The value of 0.3 $Jm^{-2}$ is less than a tenth of the theoretical limit for a pure uncontaminated silica interface, determined from fracture studies. Our measured results for HC-PCF demonstrate that the respective surface tension is comparable to the silica in standard fiber, which is already higher than the book value by a factor of three. We attribute this to the rigorous dehydration and purification steps we include in our fabrication process, which are similar to those used in the production of standard fiber. However, while, for standard fiber, dehydration and purification are important for reducing loss respectively due to OH absorption and scattering due to contaminants in the bulk material, in the case of HC-PCF we have identified that dehydration and purification are of significant importance for reducing surface capillary wave roughness. In HC-PCF, the requirement to reduce OH absorption and bulk scattering is far less than in standard fiber, since very little light, for example less than 1%, propagates in the solid material of a HC-PCF.

With the currently employed dehydration and purification techniques, we have already achieved an increase in the surface tension by a factor of about 3 compared with silica produced in a standard atmosphere. Thus, in theory, there remains about a further factor of 3 increase in σ available. Although such an increase is unlikely to be attainable in practice for silica, there appears to be scope for a significant improvement over our current value of 1 $Jm^{-2}$ by using further purification processes. Furthermore, as we have already mentioned, by the introduction of compounds (for example metal oxides) which act to increase the surface energy, an additional increase in σ and corresponding decrease in the surface roughness becomes possible. The present inventors intend to explore such options for increasing surface tension.

Using our theoretical model for characterising surface capillary roughness, we have generated the following values of spectral power (in units of $nm^2/\mu m^{-1}$), for a range of spatial wavelengths (in units of μm) and for various values of surface tension (in units of $Jm^{-2}$); assuming a transition temperature of 2000K, which is approximately the value for silica:

| Spatial wavelength (μm) | Spatial frequency $\Delta\beta$ ($\mu m^{-1}$) | σ = 1.0 $Jm^{-2}$ | σ = 1.25 $Jm^{-2}$ | σ = 1.5 $Jm^{-2}$ | σ = 1.75 $Jm^{-2}$ | σ = 2.0 $Jm^{-2}$ |
|---|---|---|---|---|---|---|
| 5 | 1.257 | 0.0017 | 0.0014 | 0.0012 | 0.0010 | 0.00087 |
| 10 | 0.628 | 0.0035 | 0.0028 | 0.0023 | 0.0020 | 0.0017 |
| 20 | 0.314 | 0.007 | 0.0056 | 0.0047 | 0.0040 | 0.0035 |
| 50 | 0.126 | 0.017 | 0.014 | 0.0012 | 0.010 | 0.0087 |
| 100 | 0.0628 | 0.035 | 0.028 | 0.023 | 0.020 | 0.017 |

Since there is an infinite number of different HC-PCF configurations and arrangements of holes, for convenience only, the values in the table have been calculated using the approximation that the holes are infinitely large. In other words, the values are substantially geometry-independent. Referring to the graph in FIG. 4, however, it is apparent that, at spatial wavelengths longer than about 20 μm (or spatial frequencies shorter than about 0.3 $\mu m^{-1}$) the power spectrum depends sensitively on the geometry of the HC-PCF holes in addition to surface tension. That is, the hole size matters and smaller holes give greater power in the spectrum. Hence, the values in the table for spatial wavelengths of 20 μm and shorter will be close to the values for practical HC-PCF whereas the values in the table for spatial wavelengths longer than 20 μm are likely to be lower than would be found in actual fibers, which do not have infinitely large holes.

In generating the values for the foregoing table, $$P_z(\Delta\beta) \stackrel{L\to\infty}{=} \frac{1}{2\pi} \frac{1}{L} \left\langle \left| \int_0^L dz\, h(z) \exp(i\Delta\beta z) \right|^2 \right\rangle \qquad (1.8)$$

defines the power spectrum, where h(z) is a 1-D height profile scan and the angled brackets denote an ensemble average over the roughness (equivalently an average over lots of independent linear traces on a surface). With the power spectrum defined according to equation (1.8), the root mean square (rms) surface roughness is determined from $$rms\ h = \sqrt{\langle h^2(z) \rangle} = \sqrt{\int_{-\infty}^{\infty} d\Delta\beta\, P_z(\Delta\beta)} \qquad (1.9)$$

and the capillary spectrum is generated using $$P_z(\Delta\beta) = \frac{k_B T_{gl}}{4\pi\sigma} \frac{1}{\Delta\beta}. \qquad (2.0)$$

Having confirmed that frozen in capillary waves are responsible for the main part of the surface roughness in HC-PCF holes, the following description shows that this roughness gives the dominant contribution to the optical propagation loss in fabricated HC-PCF.

Figure 6A:
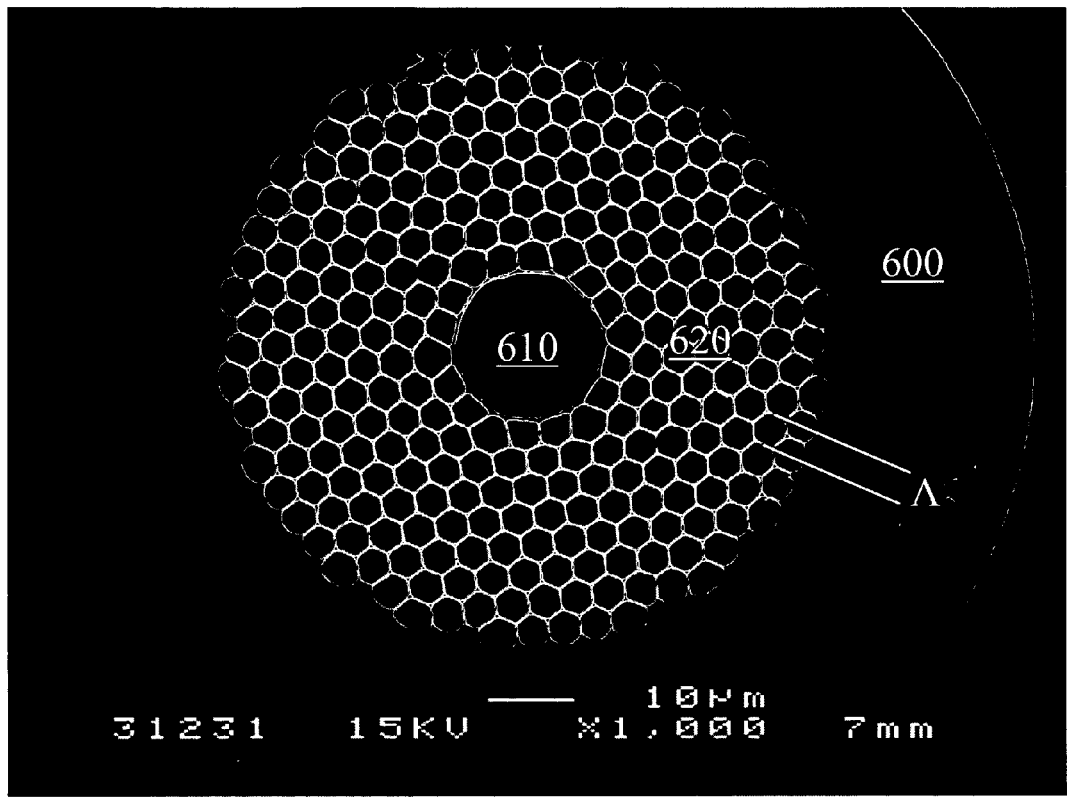
FIG. 6a is a scanning electron micrograph image of a HC-PCF sample used in angular resolved loss measurements.

FIG. 6a shows a scanning electron micrograph of a fabricated HC-PCF which is designed to operate at wavelengths around 1.55 □m and which was used in angular resolved loss measurements that are described hereinafter. The fiber is of the kind generally described in the applicant's co-pending patent application GB0306593.5 mentioned above. The fiber has a solid outer cladding 600, to provide strength and a coating layer to protect the silica and prevent light entering the fiber from the side, as in a normal fiber, surrounding a microstructured, periodic array 620 of air holes in a silica matrix and, at the center, a hollow core 610. The core 610 was formed by omitting 19 capillary tubes from a capillary tube stack used to make the fiber and a large circular capillary was inserted into the stack to support the capillaries around the core. The thickness of the core tube was chosen so that, after the fiber was drawn, the core boundary attained a thickness (which is noticeably thicker than the cladding veins) that is antiresonant close to the operating wavelength of the fiber. This greatly reduces the strength of the field of the guided mode of interest at the silica interfaces inside the core defect and thus reduces the loss. This fiber exhibits a loss of around 2 dB/km at a wavelength of 1560 nm. The cladding of the fiber has a pitch Λ in the region of about 3.75-3.83 μm, a core diameter of about 17.7 μm and an average core thickness of about 0.09-0.1Λ, an AFF of about 0.92 (92%). We have determined that the optimum core boundary thickness for this kind of fiber structure would be around 0.12Λ, in order to achieve lowest loss due to antiresonance effects, and there is clearly scope for improved structural homogeneity. Therefore, we predict that a fiber having a slightly thicker core boundary and improved homogeneity would achieve a loss figure significantly less than 2 dB/km.

Figure 6B:
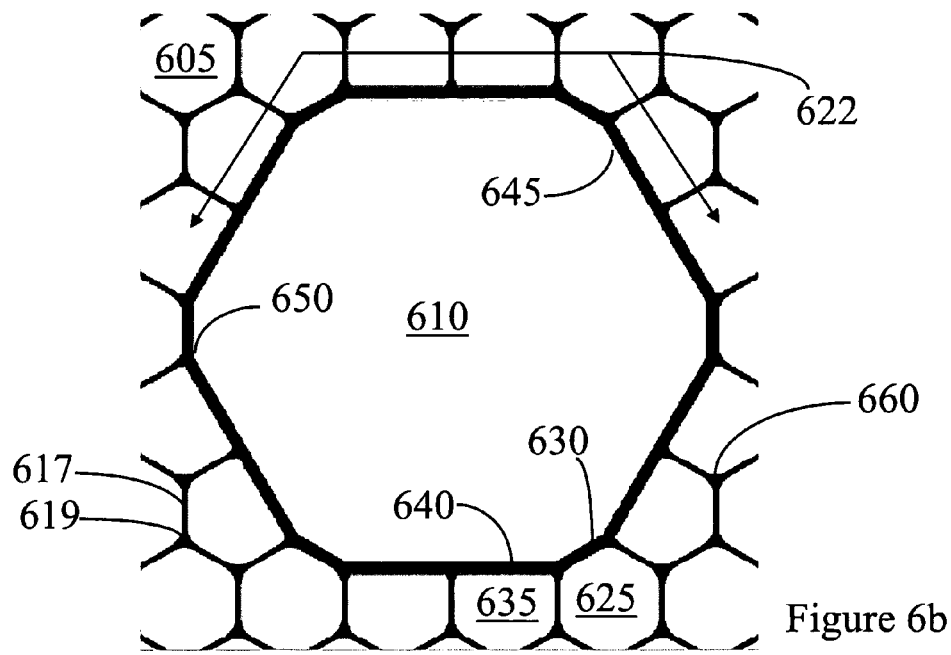
FIG. 6b is a representation of the fiber structure of FIG. 6a, which is used to model the behaviour of the fiber for comparison with the measured behaviour.

FIG. 6b is a representation of an inner region of the fiber shown in FIG. 6a, shown in transverse cross-section. In the Figure, the black regions represent fused silica glass and the white regions represent air holes in the glass. As illustrated, the microstructured inner cladding 620 comprises a triangular array of generally hexagonal cells 605, surrounding a nineteen-cell core defect 610. This region of the cladding, although not shown in FIG. 6b, typically extends outwardly to provide a specified degree of light confinement; where more cladding layers provide increased confinement. A core defect boundary 645 is at the interface between the cladding 620 and the core defect 610. As mentioned, the core defect 610 is formed by omitting or removing nineteen central cells; an inner cell, the six cells that surround the inner cell and the twelve cells that surround the six cells. The cells would have typically been removed or omitted from a pre-form prior to drawing the pre-form into the fiber. As the skilled person will appreciate, although a cell comprises a void, or a hole, for example filled with air or under vacuum, the voids or holes may alternatively be filled with another gas, or a liquid or even a solid. Equally, the silica glass may be doped or replaced by a different inorganic glass or other suitable material such as an organic polymer. For the sake of simplicity of description herein, however, the exemplary embodiments described herein are silica and air fibers.

The waveguide of FIG. 6 has a substantially periodic structure, comprising a triangular lattice of generally hexagonal holes. However, as discussed in Litchinitser et al. in Opt. Lett., Vol. 27 (2002) pp 1592-1594, photonic bandgaps may in principle be achieved in non-periodic structures. The properties of the core-cladding boundary are also important in non-periodic PBG structures and the invention is not limited to substantially periodic structures but encompasses structures with some or even a high degree of aperiodicity or irregularity in the cladding structure. However, the exemplary embodiments illustrated hereafter use a triangular lattice which will be familiar to the skilled artisan, in order not to obscure the present invention.

Hereafter, and with reference to FIG. 6b, a region of glass 617 between any two holes is referred to as a "vein" and a region of glass 619 where three veins meet is referred to as a "node". A vein can be generally characterized by its transverse, cross-sectional length and thickness at a midpoint between the two nodes to which it is attached. Veins tend to increase in thickness from their midpoint towards the nodes, although a region of substantially constant thickness at the middle of a vein tends to exist and increase in length with increasing AFF. Nodes can be generally characterized by a transverse cross-sectional diameter, which is the diameter of the largest inscribed circle that can fit within the node. In the fiber structures investigated herein, node diameter is typically larger than the thickness of the veins attached to the node.

The core defect boundary 645 comprises the inwardly-facing veins of the innermost layer of cells that surround the core defect 610.

In practice, for triangular lattice structures that have a large AFF value, for example above 0.75, most of the cladding holes 605 assume a generally hexagonal form, as shown in FIG. 6, and the veins are generally straight. Embodiments of the present invention typically have an AFF above 0.75 and more preferably above 0.85 or even above 0.9. The AFF of the fiber shown in FIG. 6a is about 0.92.

The cells forming the innermost layer 622 around the boundary of the core defect, which are referred to herein as "boundary cells", have one of two general shapes. A first kind of boundary cell 625 is generally hexagonal and has an innermost vein 630 that forms a relatively shorter side of the core defect boundary 645. A second kind of boundary cell 635 has a generally pentagonal form and has an innermost vein 640 that forms a relatively longer side of the core defect boundary 645.

There are eighteen boundary cells 625, 635 and eighteen nodes 650, which are referred to herein as "boundary nodes", around the core defect boundary 645. Specifically, as defined herein, there is a boundary node 650 wherever a vein between two neighbouring boundary cells meets the core defect boundary 645. In FIG. 6, these boundary nodes 650 have slightly smaller diameters than the cladding nodes 660. For the present purposes, the veins 630 & 640 that make up the core defect boundary are known as "boundary veins".

In order to understand the effects of resonance and anti-resonance in optical structures it is instructive to first consider a simple example of an optical resonator such as a Fabry-Perot interferometer. Whether or not light can resonate in such a feature depends on the feature's size, shape and composition, and also on the wavelength and direction of propagation of the light. As the wavelength is varied the feature moves into and out of resonance. For a given excitation, on resonance, the optical power in the features assumes a maximum. In between resonances, optical power in the features is minimized. If the relatively low refractive index regions are air, it is desirable to maximise the amount of light in these regions in order to reduce scattering, non-linearities and other deleterious effects. That is advantageous as it raises the proportion of light in the low-index regions and decreases the amount of light at the glass/air interfaces. Hence it is advantageous to incorporate in a hollow-core fiber features that possess strong distinct resonances, and adjust their sizes and shapes so that they are anti-resonant at the optical wavelengths and directions of propagation of interest.

Confinement of light to a core of a PBG fiber, which confines light to the core region by virtue of a photonic bandgap, may be enhanced by providing, at the interface between the core and the photonic bandgap cladding, a boundary which is tuned to be substantially anti-resonant. Litchinitser et al. describe in Opt. Lett., Vol. 27 (2002) pp 1592-1594 anti-resonance achieved using concentric layers of material or distinct, unconnected resonators; however, a core boundary proposed herein may comprises a single, unbroken region of relatively high refractive index at the interface between the core and the photonic bandgap structure (FIG. 6). Such a core boundary can be arranged to be anti-resonant at an operating wavelength, and thereby serve to confine light to the core of the waveguide. It is possible to achieve a similar confinement of light to a core by arranging plural anti-resonant features around an unbroken, but otherwise generally non-anti-resonant, core boundary. This latter kind of confinement is closely related to the former kind and is discussed in more detail hereinafter with reference to FIG. 14.

Considering, for example, an air-core silica-based PBG fiber, the geometry of the region of the boundary between the air core and the photonic bandgap cladding structure has profound effects on the modal properties of the fiber. In particular, the number of guiding modes within the band gap, the fraction of the light power of the guided modes confined within the air core and the field intensity of these modes at the air-silica interfaces all vary sensitively with the geometry within the region. By tailoring the geometry, the properties of an $LP_{01}$-like mode (when present), which possesses an approximately Gaussian intensity profile towards the center of the core, can be tailored so that up to and even over 99.9% of the light is confined within air, and predominantly in the core. This implies that loss due to Rayleigh scattering or IR absorption in the silica may be suppressed by up to three orders of magnitude and that nonlinearity may be substantially reduced compared with standard index guiding single mode fiber. The core boundary geometry can be designed to reduce the field intensity of this mode strongly in the vicinity of the air-silica interfaces. This has the effect of reducing scattering and mode coupling due to all kinds of surface roughness and, in particular, capillary wave roughness.

The mechanism by which an anti-resonance of a continuous core surround can occur may be understood by considering a circular tube of silica of constant thickness t and mean radius R, of the inner and outer silica/air interfaces, surrounded by air.

Destructive interference occurs for (Hankel) waves which are multiply reflected at the dielectric interfaces. The round-trip phase accumulated by a wave that emanates from the inner interface, propagates outwards to the outer interface, reflects and propagates inwards to the inner interface and is again reflected, is close to $\pi$. More generally, anti-resonances occur around thickness values giving rise to a round-trip phase given by $(2n+1)\pi$, where n is an integer satisfying $n \geq 0$. For example, in a silica and air system, for tube radii satisfying $R \gg \lambda$ (where $\lambda$ is the operating wavelength), the thickness t which gives rise to anti-resonance is determined from $$t = \frac{\lambda}{4\sqrt{n_{sil}^2 - 1}}(2n+1), \qquad (2.1)$$

where $n_{sil}$ is the refractive index of silica. As can be seen, t is independent of the radius R. In this regime, the boundaries are acting as locally planar interfaces. More generally still, anti-resonances lie between resonances, which in this case occur at $$t \approx \frac{\lambda}{4\sqrt{n_{sil}^2 - 1}}2n, \quad n \geq 1. \qquad (2.2)$$

where n is an integer. At resonances, the field is maximised within the silica of the tube.

Equations (2.1) and (2.2) relate specifically to silica and air systems, although they can be generalised to describe other material and air systems by replacing $n_{sil}$ with the refractive index of the respective material. Clearly, the thickness values for resonance and anti-resonance vary as the material refractive index and operating wavelength vary. For example, as the material refractive index increases, thickness values decrease. Conversely, if the operating wavelength increases, thickness values increase.

In the HC-PCF structure in FIG. 6, the core defect boundary 645 can be thought of as a generally annular, constant thickness region of glass surrounding the core region 610 and acting to provide confinement of light to the core essentially independently of, and in addition to, the photonic band-gap structure that forms the inner cladding region 600. Clearly, the boundary region is not perfectly annular, due to it being formed from plural, generally straight boundary veins, and is not of exactly constant thickness, due to slight variations in thickness along boundary veins and, in particular, the presence of boundary nodes. However, for the present purposes herein, this kind of core boundary will be thought of as being generally annular and of generally constant thickness.

Embodiments of the present invention may, but need not, utilize an antiresonant core boundary.

Figure 7A:
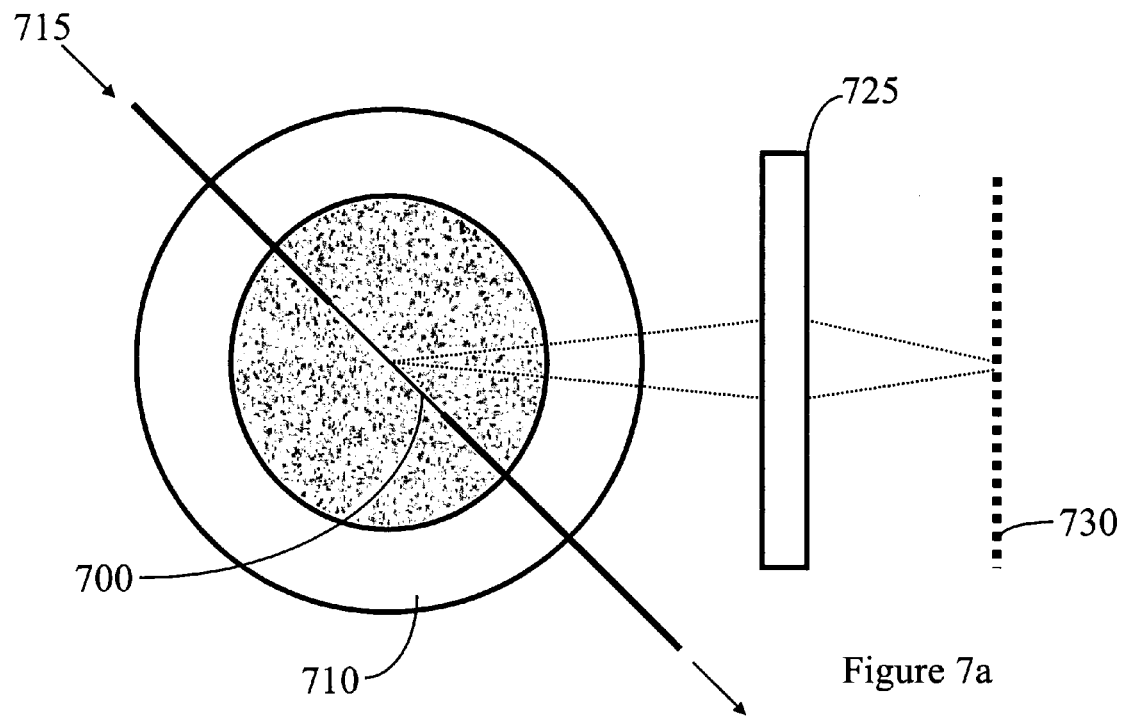
Figure 7B:
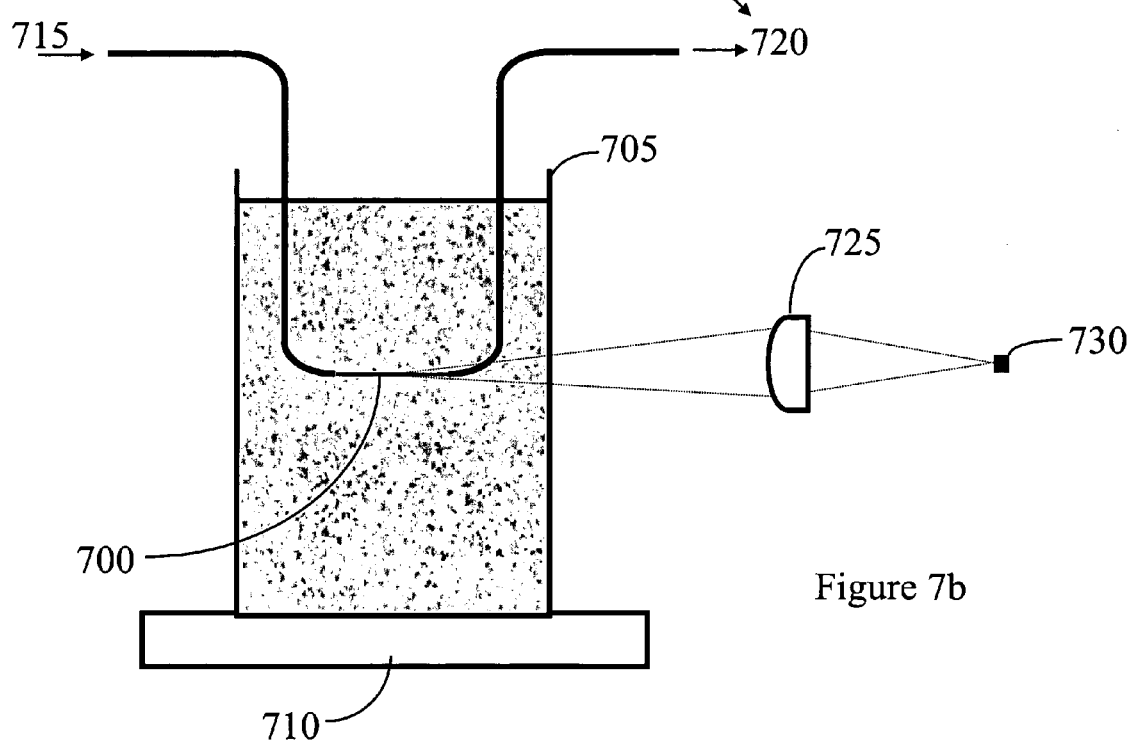

The length scales which are the main cause of loss can be inferred from angular resolved measurements of the light scattered from a guided mode. An experimental setup that can be used to take such measurements is shown schematically in FIGS. 7a (view from above) and 7b (view from one side). A 5.5 mm section of fiber 700 is stripped of its outer (acrylic) cladding and placed in a 32 mm (diameter) cylindrical silica immersion cell 705 filled with a fluid which is index-matched to silica. The un-stripped remainder of the fiber that is submerged is contained within a rubber tube so that no light can emerge from un-stripped portions of the fiber. The immersion cell 705 is positioned centrally on top of a rotatable base 710, which is controlled by a rotation controller (not shown) via a programmable computer (not shown). Light is coupled from a tuneable laser source (Agilent 81642A) into a first end 715 of the fiber and light from the second end 720 of the fiber is coupled into a power meter (Agilent 8163A). Light which exits the stripped region 700 of fiber due to mode coupling is focused by a cylindrical lens 725 into a photo-detector array 730 (12.8 mm length, 512 element TEC InGaAs array C8061 from Hamamatsu). The array 730 can then be used to measure scattered light as a function of rotational angle of the fiber. Data corresponding to the wavelength of the tuneable laser source, the output power measured by the power meter and the rotational orientation of the fiber in the tank are collected by the computer for a range of fiber orientations. From this data, it is possible to plot the graph shown in FIG. 8.

Figure 8:
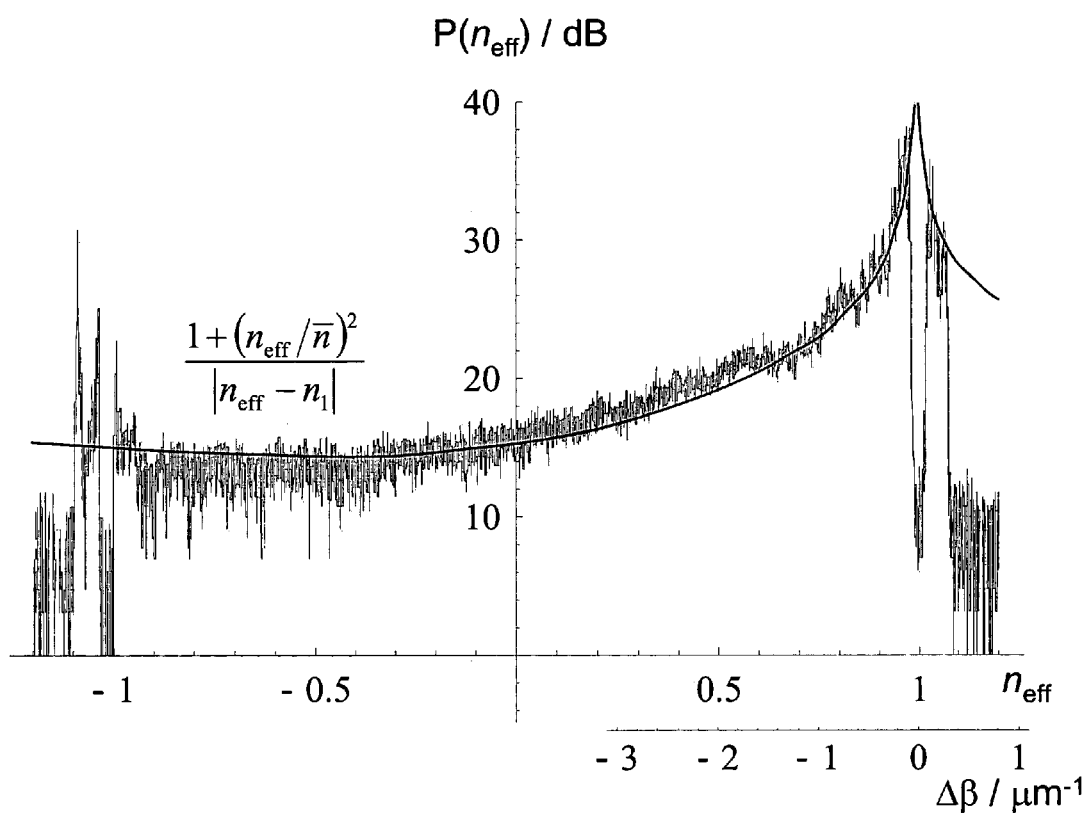
FIG. 8 is a graph of the angular resolved loss measurements generated using the apparatus shown in FIG. 7.

The graph in FIG. 8 shows the power $P(n_{\mathit{eff}})$ of the measured angular spectrum, expressed as a function of the effective index $n_{\mathit{eff}}$, at a wavelength of around 1.55 µm. The effective index can be determined from the angle of light emission θ in the index matching fluid, measured relative to the fiber axis direction of the stripped section of the fiber, simply from the relationship $$n_{\mathit{eff}} = n_m \cos \theta \quad (2.3)$$

where $n_m$ is the refractive index of the fluid. Obliquity factors have been included, so that $P(n_{\mathit{eff}})dn_{\mathit{eff}}$ provides a measure of the power lost from the fiber between effective index values of $n_{\mathit{eff}}$ and $n_{\mathit{eff}}+dn_{\mathit{eff}}$. Most of the power is found to come directly from scattering out of the fundamental (Gaussian-like) guided mode, with smaller contributions arising due to scattering from other guided modes or from scattering and leakage from long lived resonances. These other guided modes are lossier than the fundamental mode, but can nevertheless survive propagation over many meters before being attenuated. Power is continuously being fed into such modes, at a low level, due to scattering from the fundamental mode, and is then slowly lost due to their decay. Care is taken with the launch of laser light into the fiber to minimize the excitation of such unwanted guided modes at the input. The power $P(n_{\mathit{eff}})$ in FIG. 8 is shown in dB, relative to an arbitrary reference power.

A striking feature in FIG. 8 is the appearance of a band gap between effective index values of about 0.98 and 1.02. In the band gap, no electromagnetic modes exist (aside from the discrete guided modes), and so the measured power vanishes (to the level of the experimental noise). The highest effective index of electromagnetic modes existing within the cladding region, $\bar{n}$, can be inferred directly from the highest $n_{\mathit{eff}}$ in FIG. 8 where the recorded power is above the noise floor. This is seen to be around 1.07, which is in agreement with numerical computations of the band structure of the cladding region.

Upon recalling that $\beta=2\pi n_{\mathit{eff}}/\lambda=kn_{\mathit{eff}}$, equation (1.1) shows that, at a fixed wavelength, $P(n_{\mathit{eff}})$ is proportional to the factor $$\sum_{j=1}^{N_{holes}} \oint_{j\text{'th hole perimeter}} ds \oint_{j\text{'th hole perimeter}} ds' \tilde{e}_{1,j}^H(s') \quad (2.4)$$

$$\text{Im}[G_{2D}(r_j^+(s'), r_j^+(s); k, kn_{\mathit{eff}})]\tilde{e}_{1,j}(s)\tilde{\Psi}_j(s, s'; \Delta\beta)$$

where $$\Delta\beta = (n_{\mathit{eff}} - n_1)2\pi/\lambda \quad (2.5)$$

measures the β-separation from the fundamental guided mode, which has an effective index $n_1$ calculated to be 0.996, to the scattered radiation.

The effective index variation of the electromagnetic mode structure of the fiber environment is encapsulated by the Green's tensor term. Within the band gap region, the vanishing of the electromagnetic modes (aside from the discrete guided modes) is reflected in a vanishing of this Green's tensor term. Sufficiently far from the band gap region, to a large extent, band structure features become indistinguishable and the Green's tensor term approximately attains the form for a homogeneous medium. Away from the effective index of the fundamental guiding mode $n_1$, where $\Delta\beta$ becomes of order and greater than 1 µm$^{-1}$, the roughness spectrum $\tilde{\Psi}_j(s,s',\Delta\beta)$ rapidly decreases with increasing $\Delta s = s - s'$ and most contributions to the loss come from perimeter points which are separated by less than a wavelength λ. In this regime, the imaginary part of the Green's tensor becomes smoothly dependent upon the effective index. In the limit $\Delta s \to 0$, for a homogeneous medium of index $\bar{n}$, it becomes $$\text{Im}[G_{2D}(r_j^+(s'), r_j^+(s); k, kn_{\mathit{eff}})] \overset{s-s' \to 0}{=} \quad (2.6)$$

$$\frac{1}{16\pi}\begin{pmatrix} 1+\left(\frac{n_{\mathit{eff}}}{\bar{n}}\right)^2 & 0 & 0 \\ 0 & 1+\left(\frac{n_{\mathit{eff}}}{\bar{n}}\right)^2 & 0 \\ 0 & 0 & 2\left[1-\left(\frac{n_{\mathit{eff}}}{\bar{n}}\right)^2\right] \end{pmatrix}$$

The details of the $n_{\mathit{eff}}$-dependence of the electromagnetic term in equation (2.4) depend on the direction of the E-field of the light travelling in the fundamental guiding mode. Generally the component along the fiber direction (0z) is small compared to the other two components, so that away from band gap region one has the approximate proportionality $$\tilde{e}_{1,j}^H(s')\text{Im}[G_{2D}(r_j^+(s'), r_j^+(s); k, kn_{\mathit{eff}})]\tilde{e}_{1,j}(s) \overset{s-s' \ll \lambda}{\propto} 1+\left(\frac{n_{\mathit{eff}}}{\bar{n}}\right)^2 \quad (2.7)$$

At effective indices well away from $n_1$, so that $\Delta\beta > 1$ µm$^{-1}$, the roughness spectrum $\tilde{\Psi}_j(s,s',\Delta\beta)$ at the small values of Δs=s'−s which dominate the integrals in equation (2.4), attains the form 1/Δβ as discussed hereinbefore. Thus, in this regime, an angular resolved loss spectrum approximately given by the form $$P(n_{\mathit{eff}}) \propto \frac{1 + (n_{\mathit{eff}}/\bar{n})^2}{|n_{\mathit{eff}} - n_1|} \quad (2.8)$$

results due to the surface capillary wave scattering.

FIG. 8 superimposes upon the measured angular spectrum a curve having the functional dependence of equation (2.8). Away from the band gap regions, this dependence is seen to closely fit the experimental trace.

Closer to the band gap region the measured spectrum deviates from the form given by equation (2.8). This is due in part to a modification in the functional dependence of the electromagnetic term in equation (2.4). There exists an increase in the density of cladding modes close to the band gap edges. Furthermore, resonances associated with the presence of the core can occur in this region. The main cause of the change in the behaviour of the measured spectrum as the band gap is neared is, however, believed to be due to the change in functional dependence of the surface spectrum term $\tilde{\Psi}_j(s,s',\Delta\beta)$. As $\Delta\beta$ is decreased, the spectrum tends to the dependence $1/\Delta\beta^2$ as previously described. Ignoring the change in the electromagnetic properties associated with approaching the band gap, the loss spectrum for small $\Delta\beta$ is then expected to vary approximately according to $$P(n_{\mathit{eff}}) \propto \frac{1 + (n_{\mathit{eff}}/\bar{n})^2}{(n_{\mathit{eff}} - n_1)^2} \quad (2.9)$$

Figure 9:
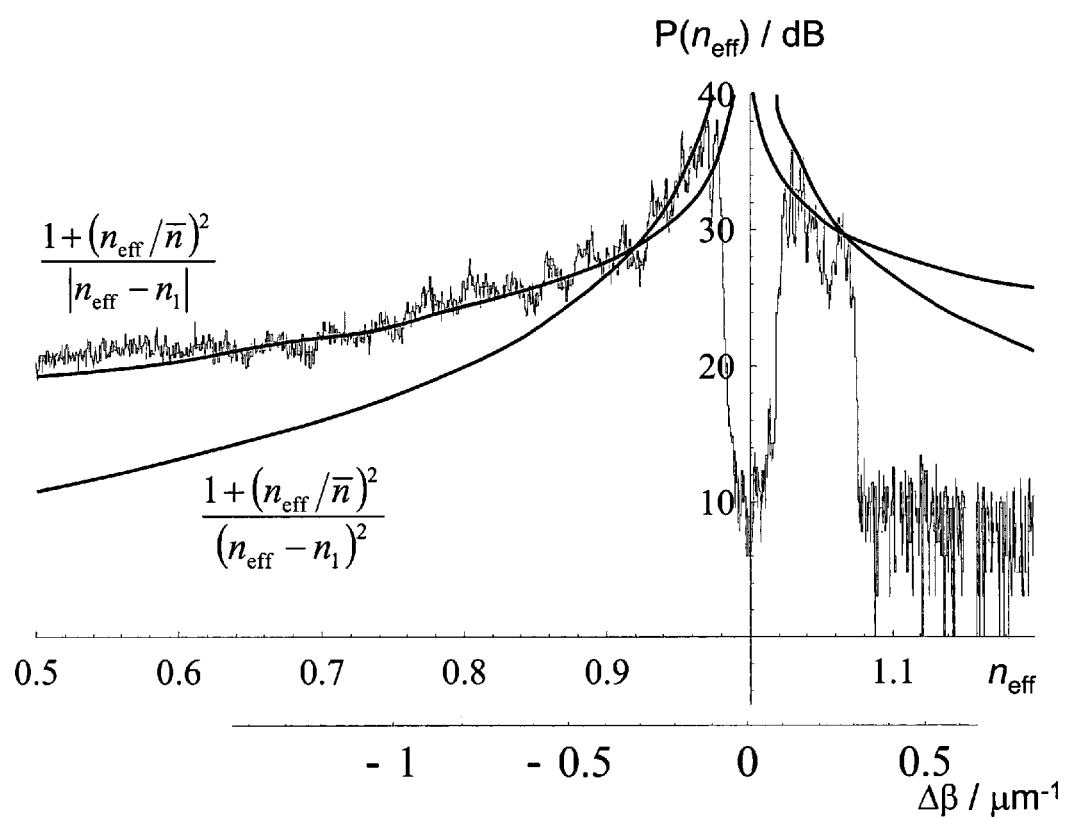
FIG. 9 is a graph which focuses in on one area of the graph of FIG. 8.

FIG. 9 is a graph which shows the measured angular loss spectrum close the band gap region, together with curves which vary according to equations (2.8) and (2.9). A changeover in the measured $n_{\mathit{eff}}$ dependence, from approximately obeying (2.8) to a dependence closer to (2.9), occurs at an effective index of around 0.93, which corresponds to $\Delta\beta \sim 0.3$ μm$^{-1}$. The associated length scale is around 20 μm, which is consistent with the perimeter length of the holes which are adjacent to the core surround in the HC-PCF shown in FIG. 6. The anti-resonant nature of the core surround results in the guided mode E-field at the inner surface of the core surround being small compared to the field which exists on its outer surface, i.e. on the perimeters of the first layer of holes around the core hole. Thus the scattering from these holes is in fact larger than from the inner surface of the core surround for this design. In contrast, a HC-PCF not having an antiresonant core boundary would more likely have a stronger E-field at the inner surface.

The good agreement between the measured angular loss spectrum and the loss spectrum predicted using a power spectrum appropriate to surface capillary waves in the holey geometry provides strong evidence that capillary wave roughness is the cause of most of the loss.

Figure 10:
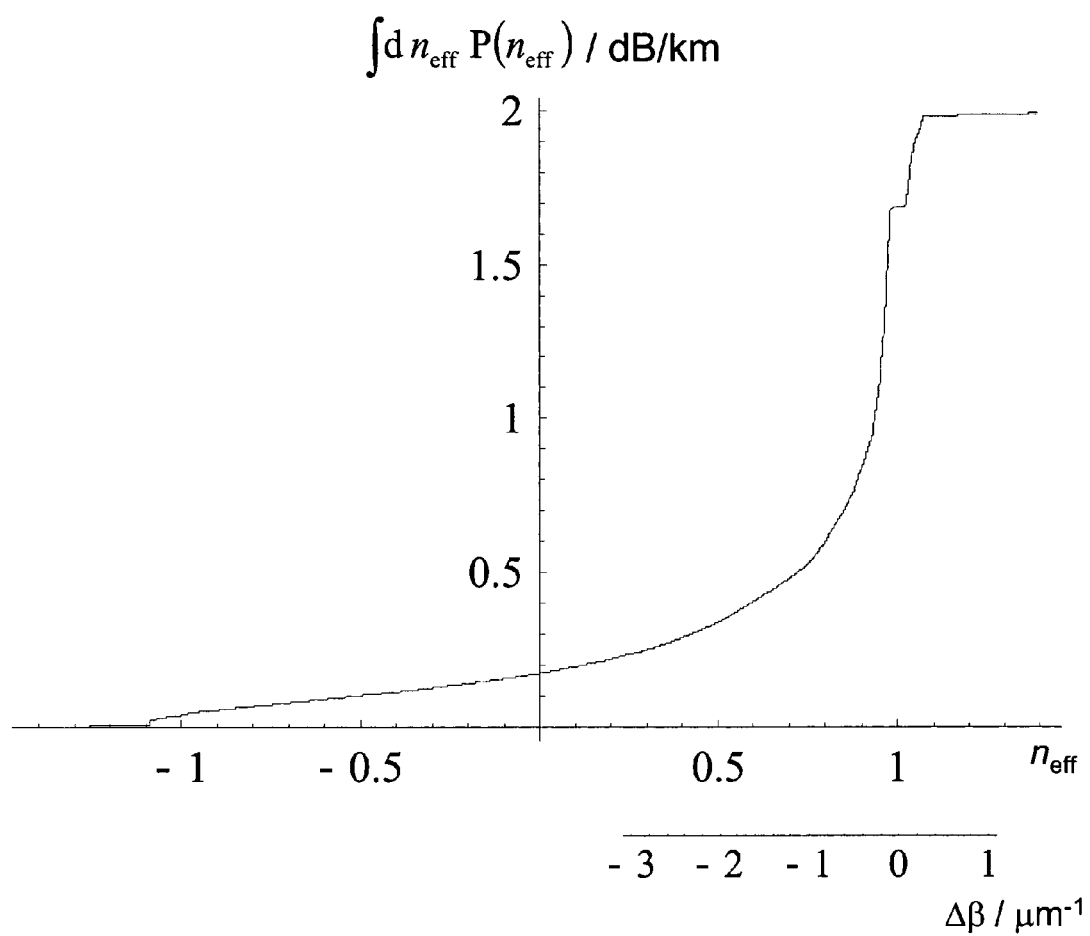
FIG. 10 is a graph of the integral of the trace shown in FIG. 8.
Figure 11:
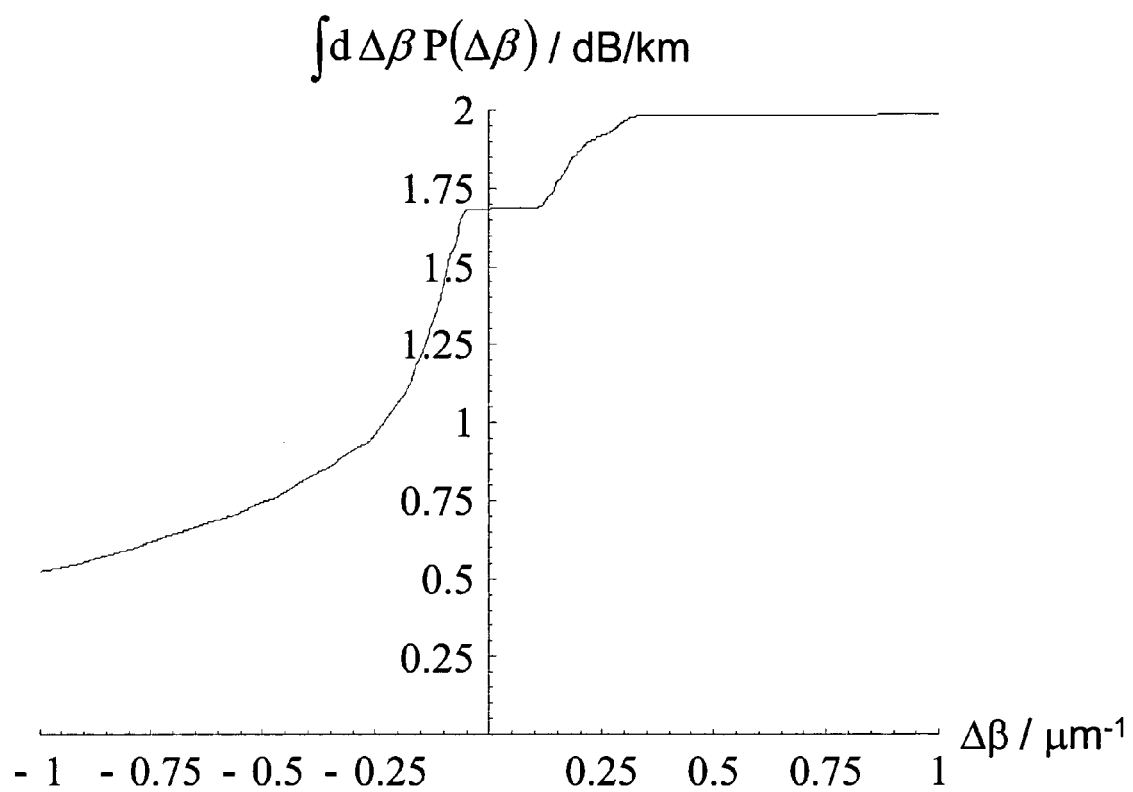
FIG. 11 is a graph which focuses in on one area of the graph in FIG. 10.

The graph in FIG. 10 shows the integral $$\int_{-\bar{n}}^{n_{\mathit{eff}}} P(n_{\mathit{eff}}) dn_{\mathit{eff}}$$

of the power trace shown in FIG. 8. The data has been normalised, such that over the entire range of effective index, the total power that is lost is 2 dB/km; corresponding to the loss of the fiber described with reference to FIG. 6. This loss value was obtained by a standard cut-back technique. The rapidity of the rise in the integrated power towards the band edges is marked. The graph in FIG. 11 shows the same data as in FIG. 10 but focuses in closer to the band gap region and re-expresses the integrated power in terms of Δβ, From this plot, it is apparent that 50% of the scattered light is emitted within $|\Delta\beta| \leq 0.3$ μm$^{-1}$. Thus half the power is lost within the region where the surface power spectrum $\tilde{\Psi}_j(s,s',\Delta\beta)$ deviates appreciably from the infinite surface form and has been affected by the geometry of the holes. Increasing the perimeter lengths of the holes decreases the spectral power at small Δβ as already described. As a practical example, by doubling the perimeter length of the holes which have appreciable field strength (of the fundamental guided mode) at their perimeters, the component of the loss within this region of small Δβ will reduce by a factor of approaching 2, meaning that the overall loss will decrease by a factor of nearly one quarter. This, of course, assumes that the change in the hole geometry does not adversely affect the guided mode properties in other ways, so that in particular $$\sum_{j=1}^{N_{holes}} \oint_{\substack{j\text{'th hole}\\ \text{perimeter}}} |\tilde{e}_{1,j}(s)|^2 ds \quad (3.0)$$

remains essentially unaltered.

Although a reduction in the loss of around one quarter is not that substantial, realisation that hole size is relevant due to the affect on the capillary wave roughness power spectrum is likely to have a significant impact on the design of HC-PCF in future, particularly in the pursuit of loss values below those of conventional fibers.

In addition, the reduction of the capillary wave roughness incurred by increasing the hole size provides a further motivation for fabricating fibers with a high AFF in the cladding. This is because increasing the AFF requires that the pitch in the cladding be increased in order to maintain a band gap at a given fixed wavelength. This pitch dependence has the biggest impact on the cladding hole size. A high AFF, in conjunction with favourable hole geometry, also leads to an increased band gap width. Thus the separation Δβ of the cladding states from the fundamental guiding mode is increased. This cuts out a larger fraction of the most harmful (being approximately $1/\Delta\beta^2$ dependent) part of the capillary wave roughness spectrum. There will, however, remain coupling to an increased number of guided modes within the widened band gap.

Since only the interfaces of the core surround and its neighbouring holes experience an appreciable field strength of the fundamental guided mode, only these holes have been considered in depth herein in connection with the surface roughness scattering. Obviously, holes further away from the core will also contribute to loss by virtue of capillary wave roughness on their inner surfaces. However, their contribution to loss will typically decrease exponentially with distance away from the core, and so their impact on loss can be ignored for practical purposes.

FIG. 12a is a diagram of the transverse cross section of a HC-PCF structure having a seven cell core defect 1210, with the addition of a core boundary 1245 including antiresonant "beads" or "nodules" 1250 at the mid-point along each of the longer boundary veins. While some prior art structures, for example as described in the "Low Loss (13 dB) Air core defect Photonic Bandgap Fiber" paper referred hereinbefore, have a similar form, their respective nodules are not arranged to be antiresonant at an operating wavelength of the fiber.

This HC-PCF structure in FIG. 12a will be compared with a structure described hereinafter as being an embodiment of the present invention.

A cladding region of the structure in FIG. 12a comprises a regular array of hexagonal cladding cells, similar to the structure in FIG. 6b.

Each nodule 1250 around the core boundary is a generally oval-shaped with its minor dimension oriented radially with respect to the center of the core defect. Each nodule 1250 has a length that is about half a pitch of the cladding structure and a width that is about one third of its length.

The diagrams in FIGS. 12b and 12c are mode intensity plots calculated by solving Maxwell's vector wave equation for the fiber structure, using known techniques. In brief, Maxwell's equations are recast in wave equation form and solved in a plane wave basis set using a variational scheme. An outline of the method may be found in Chapter 2 of the book "Photonic Crystals—Molding the Flow of Light", J. D. Joannopoulos et al., ©1995 Princeton University Press.

The nodules 1250 are generally anti-resonant at the operating wavelength of the fiber, so that light of a fundamental mode is substantially excluded from the nodule, as shown by the diagram in FIG. 12c.

The diagram in FIG. 12b plots the light intensity profile on a linear scale and shows that the fiber structure is effective in guiding light in a Gaussian-like mode in the hollow core of the fiber. The diagram in FIG. 12c plots the light intensity on a log scale and, thus, more clearly shows the light's intensity profile, even at extremely low levels, away from the center of the core of the fiber. In particular, it can be seen that the light is most intense in the core region and the intensity drops to a near-null along a substantial length of the core boundary. Light can also be seen to exist in the cladding region, predominantly in the cladding holes.

According to our findings, in relation to the fiber structure of FIG. 12a, the light intensity is down on average by about 20 dB, relative to the peak power at the center of the core defect, in the glass of the core boundary. Over the region of structure shown, the fraction of light in air rather than in the glass is in excess of 0.99. Another measure of the performance of this structure is the amount of light that exists at the air/glass interfaces of the entire structure: where, obviously, less light at the interfaces results in reduced scattering due to surface roughness of the glass.

A value we call F-factor has been identified by the present inventors as a useful figure of merit, which relates to how much light interacts with the air-silica interfaces of a fiber structure. A low value of F-factor indicates low interaction, which, in turn, indicates reduced mode coupling and scattering due to surface roughness of any kind.

We define F-factor as $$F = \left(\frac{\varepsilon_0}{\mu_0}\right)^{1/2} \frac{\oint_{\substack{\text{hole}\\ \text{perimeters}}} ds |E_0(r')|^2}{\int_{x\text{-section}} dS(E_0 \wedge H_0^*) \cdot \hat{z}}. \quad (3.1)$$

and a thorough derivation of F-factor as defined in equation (3.1) can be found in applicant's co-pending patent applications 0306593.5 and 0322024.1, identified above.

The inventors have found that a comparison of the interface scattering strength from guided modes of different fibers with similar interface roughness properties can be performed approximately using the F-factor.

The Calculated F-factor for the fiber structure shown in FIG. 12a is around $0.14\Lambda^{-1}$, which is found to be a relatively low value for a seven cell core defect structure compared with a similar structure not having the antiresonant nodules. We have found that a similar structure, not having the antiresonant nodules 1250, has an F-factor of around $0.9\Lambda^{-1}$ and a light in air fraction of only around 0.96. Clearly, therefore, when considering F-factor and light in air fraction, there is significant advantage in making a structure with the anti-resonant nodules.

Figure 13A:
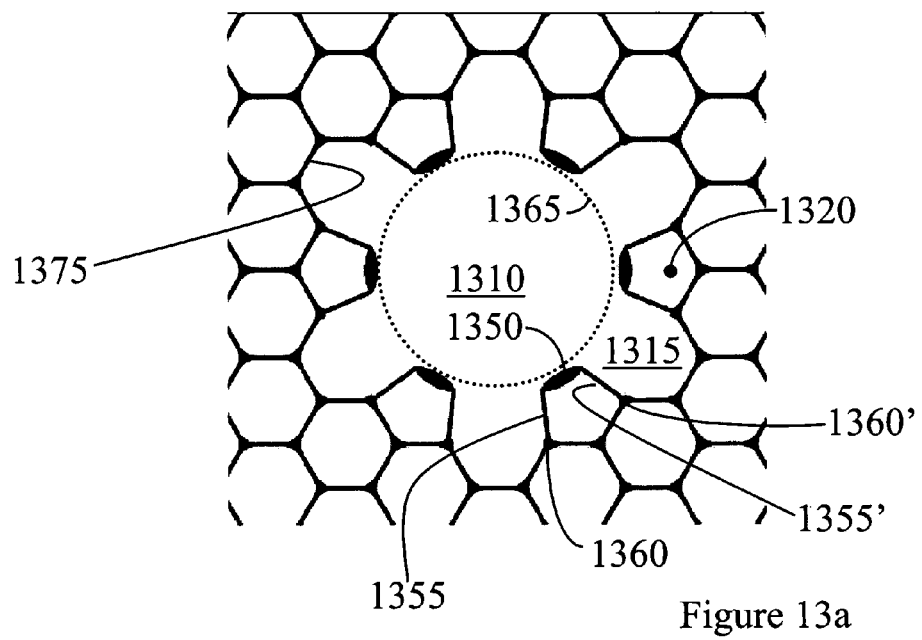
FIG. 13a is a diagram of the transverse cross section of a HC-PCF structure according to an embodiment of the present invention.

FIG. 13a is a diagram of the transverse cross section of a HC-PCF structure according to an embodiment of the present invention. A cladding region of the structure comprises a regular array of hexagonal cladding cells, similar to the structure in FIG. 12a, and a core region 1310 of the structure has a generally lobed appearance, having six lobes 1315 extending outwardly from the center of the core. Each lobe 1315 has a general size and shape that would be expected to form by omitting or removing each boundary vein of a hexagonal boundary cell from around the core boundary of an otherwise typical seven cell core defect structure. Effectively, the core has a size and general shape that would result from removal or omission of an inner cell, the six cells surrounding the inner cell and alternate cells from around the next layer of cells out from the center of the core. This equates to a thirteen cell core defect.

Between each lobe 1315 of the core defect is a cladding cell 1320, which protrudes into the core defect. Each protruding cell 1320 comprises, as its innermost part, a generally oval-shaped nodule 1350 connected by two boundary veins 1355 and 1355'—one attached to each end of the nodule—to the nearest cladding nodes 1360 and 1360'. The nodules 1350 have the same size, shape, orientation and position as those illustrated in FIG. 12a. Therefore, the nodules 1350 are generally anti-resonant at the operating wavelength of the fiber, so that light of a fundamental mode is substantially excluded from the nodules, as shown by the log intensity plot in FIG. 13c.

Figure 13B:
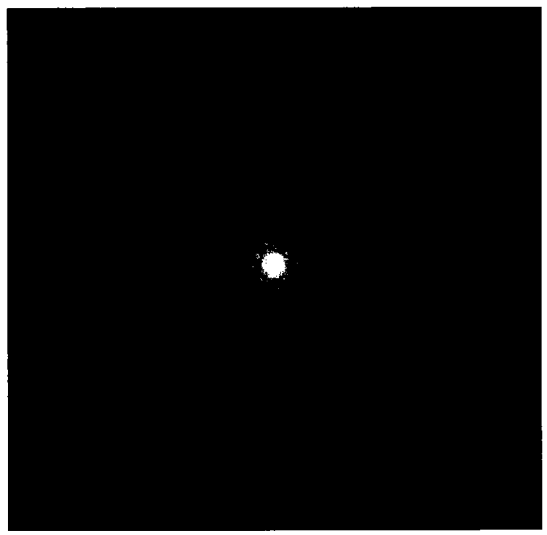
Figure 13C:
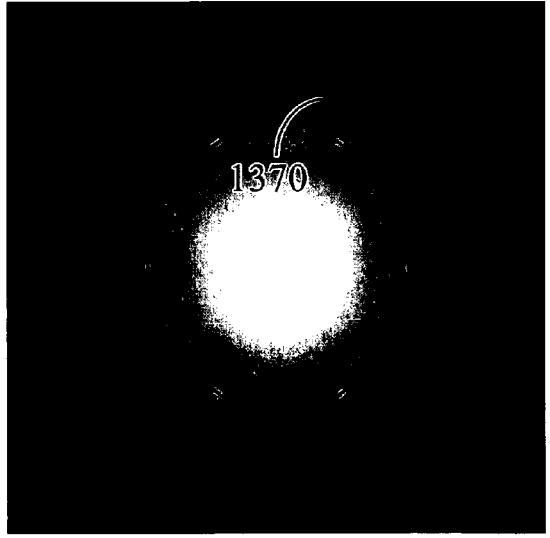

The diagram in FIG. 13b is a linear light intensity profile for the fiber structure in FIG. 13a. This profile is indistinguishable from the profile for the fiber structure in FIG. 12a, indicating that the structure in FIG. 13a is also effective at guiding light in a Gaussian-like mode in the hollow core of the fiber.

As shown in FIG. 13b, although the core defect has six lobes extending outwardly from the center of the core defect, a significant amount of light guided in the core defect region is guided within the region defined by the dotted circle 1365, which is the largest inscribed circle that fits within the core defect. According to our calculations, the light power is down on average by more than 10 dB, relative to the peak power at the center of the core defect, around the periphery of the dotted circle. In addition, the light power is down by more than 50 dB, relative to the peak power at the center of the core defect, in the glass of the boundary veins at the outer extremities of the lobes. Over the region of structure shown, the fraction of light in air rather than in the glass is in excess of 0.99, which is similar to the performance of the structure shown in FIG. 12a. In contrast, the F-factor for the structure in FIG. 13a is only around $0.075\Lambda^{-1}$, which is around half the value of the structure shown in FIG. 12a. In other words, there is significantly less interaction of light with the glass-air interfaces in the structure shown in FIG. 13a, which will naturally result in less scattering and mode coupling due to surface roughness of any kind on the glass interfaces.

Figure 14A:
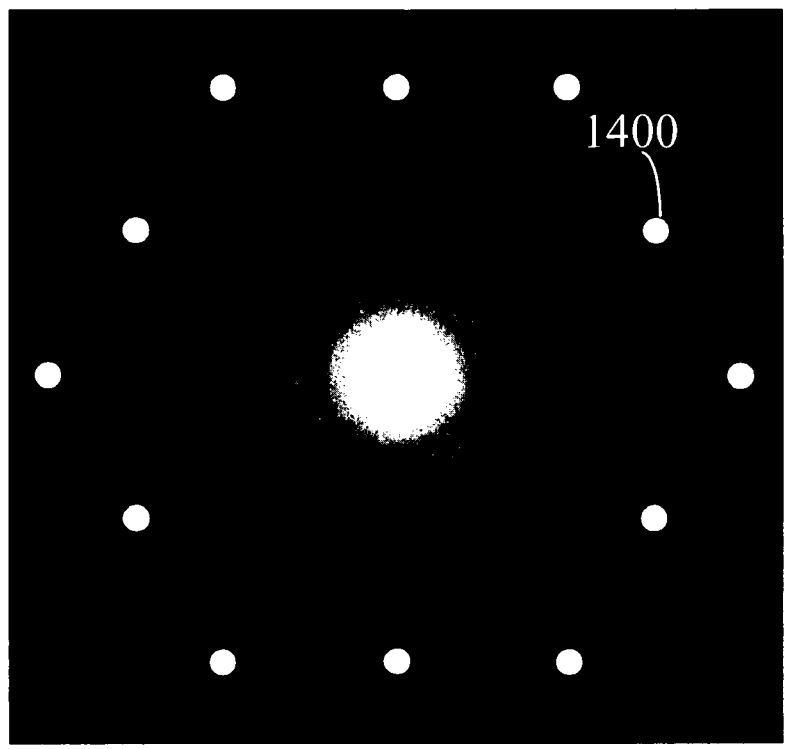
FIGS. 14a and 14b are respectively linear and log mode intensity plots of a fundamental-like mode confined by a hexagonal corral of round cross section elongate rods.
Figure 14B:
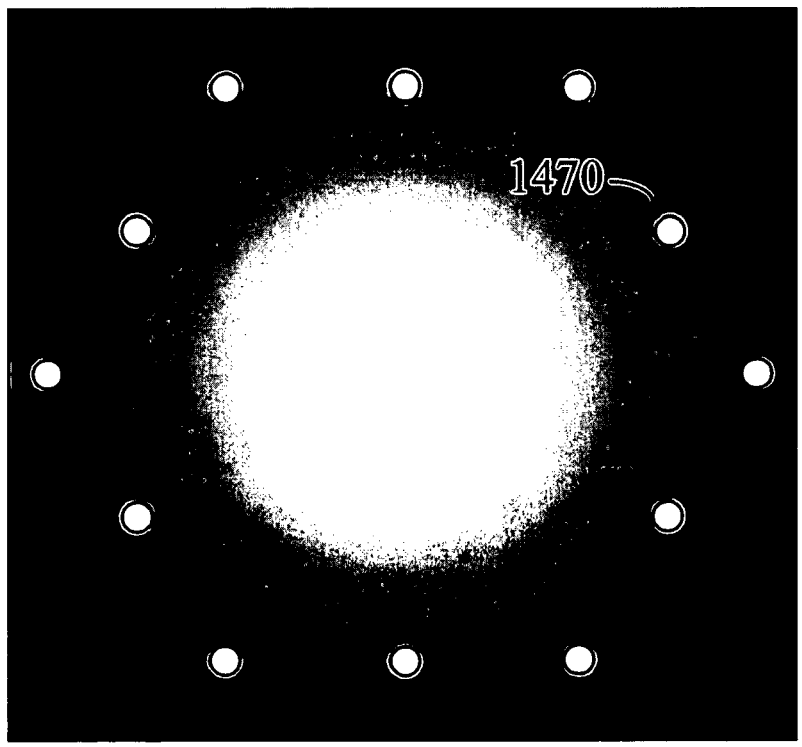

The improvement in F-factor for the structure in FIG. 13a can be explained qualitatively with reference to the mode intensity plots in FIGS. 14a and 14b. FIG. 14a is a linear intensity plot and FIG. 14b is a logged intensity plot. The plots show how light interacts with a hexagonal corral of round, unconnected, anti-resonant, spaced apart silica rods 1400, identified as white circles. As shown in FIG. 14a, it is clear that the arrangement of appropriately-sized rods alone can confine a significant amount of light in a Gaussian-like mode.

In general, we have found that the mechanism by which anti-resonance due to localized regions of high index can occur may be understood by considering the behaviour of the corral of high index rods, as shown in FIG. 14a, which are distributed around a closed loop, which may or may not be a circle. The rods are everywhere surrounded by air. This system may be analysed quickly and accurately by employing a multiple scattering approach which fully exploits Mie-scattering theory; the field scattered from each cylinder is expanded in a multipole series. By applying the electromagnetic boundary conditions at the surfaces of the rods, an eigenvalue equation is derived. The method invokes radiating boundary conditions and can readily calculate leaky modes as well as guiding modes of the system; the former are obtained as solutions with complex β-values, with β the wave vector component along the direction of a cylinder axis.

A corral system is found to support an $LP_{01}$-like leaky mode solution, as shown in FIG. 14, which possesses an approximately Gaussian intensity profile centered at a point p in the air region which is enclosed by the corral arrangement. Those solutions exist close to the air light line, $\beta=\omega/c$, so that the rods have a strong influence on the field. The rods force near nulls in the field intensity to occur close to their boundaries. For a given arrangement or rods, by adjusting their diameters, the near nulls can be placed very close to the inner rod boundaries. It is observed that Im[β] of the leaky mode solution is minimized when this occurs, meaning that the leakage rate is minimized. That is interpreted as an anti-resonance of the corral system; anti-resonances of more simple confining systems such as a dielectric ring are also signalled by a near-null occurring very close to the innermost dielectric interface. The confining ability of a corral system is very dependent on the number and the location of the high index regions. If the regions are too far apart, such that for the $LP_{01}$-like leaky mode solution $|\sqrt{(\omega/c)^2-\beta^2}|d$ exceeds approximately π, with d the largest separation of neighbouring high index regions in the corral, confinement will be weak. That is because the mode can resolve one or more of the gaps between the high index regions and so escape. That resolution argument can also be invoked to explain why the corral system supports far fewer leaky modes than a continuous element such as a dielectric ring. The in-plane wave vector associated with higher order modes exceeds that of the more slowly varying $LP_{01}$-like mode, so that in the corral system, the higher order modes are more able to resolve the gaps between the high-index regions and leak away. This is an advantage of the corral system over the continuous design; the latter will generally support more modes within and nearby the band gap region and will therefore be more subject to mode coupling loss.

Optimum confinement induced by a number of identical, parallel high-index rods in a corral geometry is achieved when the rods are evenly spaced over the circumference of a circle. The optimum number of rods to place around the circle depends on its radius R. The width of the anti-resonance as a function of parameters such as rod radius or wavelength is increased by including more rods, but increasing the number of rods beyond a certain number will weaken the confinement that can be achieved.

Corral systems comprising parallel elongated elements with different shapes in cross-section, such as ovals, are found to behave similarly to the foregoing rod case. The confining ability of the anti-resonance will depend upon the shape and orientation of the elements; shapes with smooth surfaces with no locally high rates of curvature can be expected to induce better confinement than shapes which possess sharp features on their surfaces.

In the structures in FIGS. 12a and 13a, thin boundary veins connect the antiresonant nodules to the cladding structure. We have found that if the veins connecting the antiresonant nodules together are relatively thin, for example having a thickness less than 0.15 times the operational wavelength λ, then these veins do not themselves induce an anti-resonance effect; the anti-resonance is associated only with the substantially isolated high index regions. Indeed, it is found that localized regions of high index on a thin core surround can confine light better than a continuous core surround which possesses an approximately even density of silica.

The logged plot in FIG. 14b shows that the rods each cast what can be described as a low intensity wake 1470, which emanates from the inwardly-facing surface of each rod and trails from either side of each rod along a curved path away from the center of the corral. Similar wakes 1370 appear in FIG. 13c, which is a log intensity plot for the fiber structure in FIG. 13a, to emanate from the inner edges of the nodules 1350. It is especially notable that the wakes appear to substantially coincide with the boundary veins 1355 and 1355' that support the nodules 1350. As such, these boundary veins will naturally experience reduced interaction with light guided in the core defect of this structure, which is partly responsible for the reduced F-factor.

Another reason for the reduced F-factor of the structure shown in FIG. 13a is that the light intensity in the lobes is able to decay by more than 50 dB, below the maximum value at the center of the core, by the time the field reaches the boundary at the outer extremity 1375 of the lobes. This is in contrast to the 20 dB drop in intensity experienced by the field at the core boundary of the fiber structure in FIG. 12a. The ability for the light intensity to drop significantly further than in a typical seven cell core defect structure gives the lobed fiber structure performance characteristics similar to a nineteen cell core defect fiber, at least in the lobes, which typically permits the light field to decay further than in a seven cell core defect structure; resulting in lower F-factor and light in glass fraction values than a seven cell core defect fiber.

It is clear that antiresonant nodules can be designed to have a significantly beneficial impact on the performance of HC-PCF structures. In addition, by changing the shape of the core defect, to include lobes and have antiresonant nodules projecting inwardly towards the center of the core defect, the veins supporting the nodules can be arranged to coincide with the wakes, or low intensity regions of the light field, further reducing the interaction between the light and the core boundary.

The core boundary in FIG. 12a has a length, which is only about 10% longer than the circumference of the largest inscribed circle (represented by a dotted circle in FIG. 12a) that fits within the core defect. By way of comparison, the core boundary in FIG. 13a has a length, due to the lobes, which is about two and a half times greater than the circumference of the largest inscribed circle (represented by a dotted circle in FIG. 13a) that fits within its core defect. The two inscribed circles have generally the same diameters. Thus, according to the present invention, light guided in the core defect of the structure in FIG. 13a will, due only to it having a different geometry, experience less than half the degree of mode coupling due to capillary wave roughness on the inner surface of the core boundary than light guided in the core defect of the Fiber structure in FIG. 12a.

Overall, therefore, compared with the structure in FIG. 12a, the structure shown in FIG. 13a has significantly reduced mode coupling loss due to it having both a reduced F-factor and reduced capillary wave roughness.

The embodiment of the present invention illustrated in FIG. 13a employs anti-resonance to substantially excludes light from the solid material of the fiber in a core boundary region. Reducing by anti-resonance the proportion of light propagating in the solid material of the fiber reduces still further the losses due to bulk material effects such as Rayleigh scattering; such losses are of course already low in a conventional HC-PCF, as very little light is propagating in solid material in such fibers, compared with standard fibers.

However, whilst anti-resonant designs are described as the examples of the lowest-loss fiber designs we have at present, it should be understood that the present invention is not limited to such anti-resonant HC-PCF but rather will also be effective in HC-PCF not including anti-resonant features.

Figure 15A:
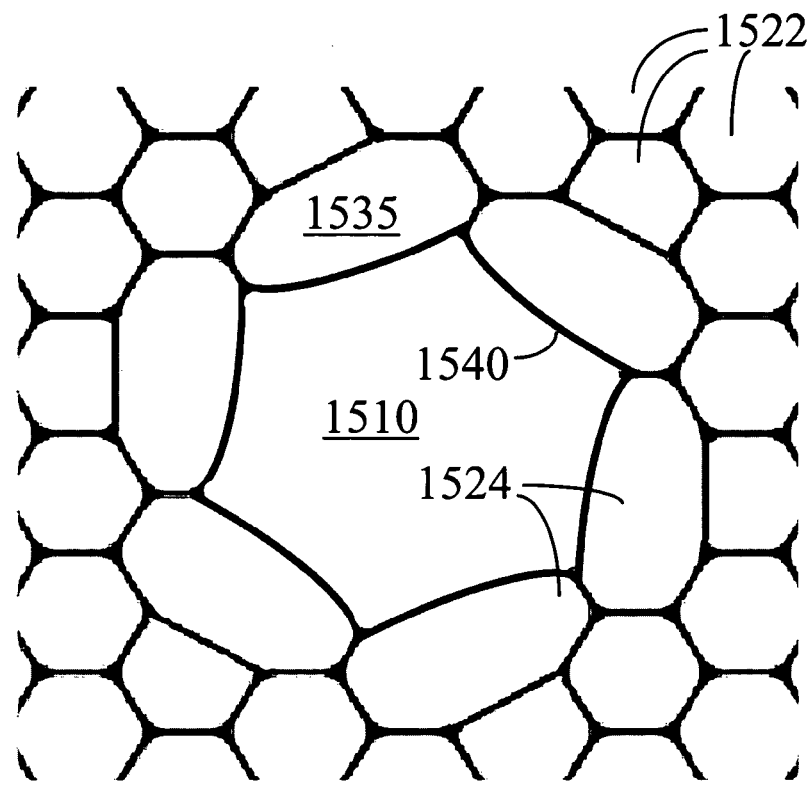
FIGS. 15a and 15b are diagrams of the cross sections of an inner region of two exemplary HC-PCF structures according to further embodiments of the present invention.

FIG. 15a is a diagram of a transverse cross section of an alternative fiber structure according to an embodiment of the present invention. In this example, the structure has an outer microstructured cladding region 1522 and a distinct inner microstructured cladding region comprising a single layer 1524 of holes 1535 adjacent to and around a core defect 1510. Of course, as with other structures described herein, the structure in FIG. 15a will in practice have one or more additional outer cladding regions. The inner microstructured cladding region 1524 comprises six generally oblong holes arranged lengthwise, end-to-end around the core defect. Each oblong hole has a general size and shape that would be expected by omitting or removing a cladding vein from between two neighbouring boundary cells of an otherwise typical seven cell core defect structure. The outer cladding region 1522 has the same characteristics as the cladding illustrated in FIG. 12a.

The oblong holes of the inner cladding 1524 of the structure in FIG. 15a have perimeter lengths of the order of one and a half times longer than the perimeter lengths of the outer cladding holes. Thus, according to the present invention, each hole in the inner cladding region would cause around 66% less mode coupling due to capillary wave roughness then a normal sized hole. In addition, mode coupling would be reduced due to the reduction in silica/air interface area of the inner layer of holes that naturally results from halving the number of holes.

Figure 15B:
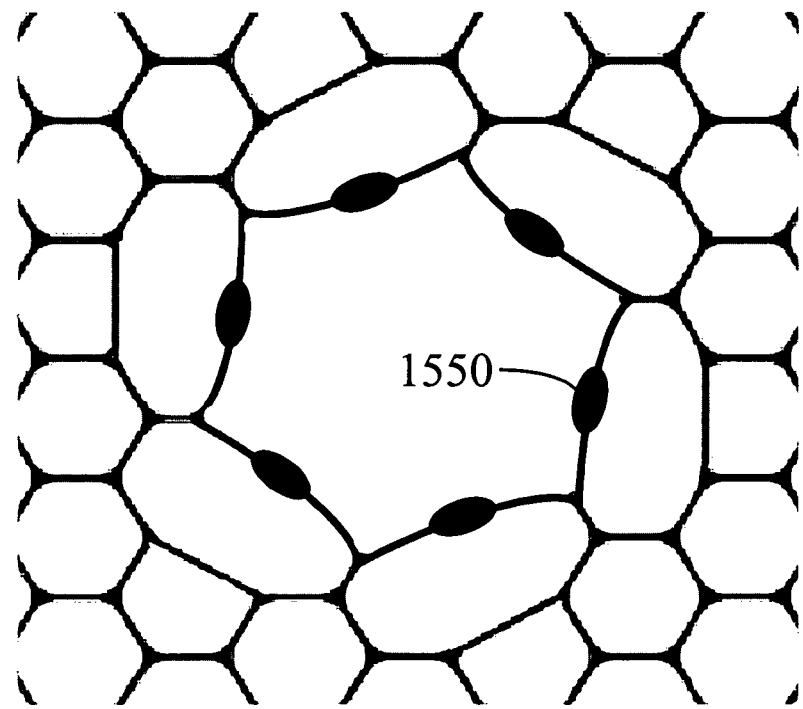

FIG. 15b is a diagram of a transverse cross section of yet another alternative fiber structure according to an embodiment of the present invention. The structure has a similar geometry to the structure in FIG. 15a. However, the structure in FIG. 15b includes pronounced nodules 1550 generally at the mid-points of the boundary veins 1540 around the core defect 1510. These nodules 1550 are arranged to have a size which renders them antiresonant at an operating wavelength of the fiber.

The structures in FIGS. 13a, 15a and 15b closely resemble practical optical fiber structures, which have either been made or may be made according to known processes or the processes described hereinafter.

Figure 16A:
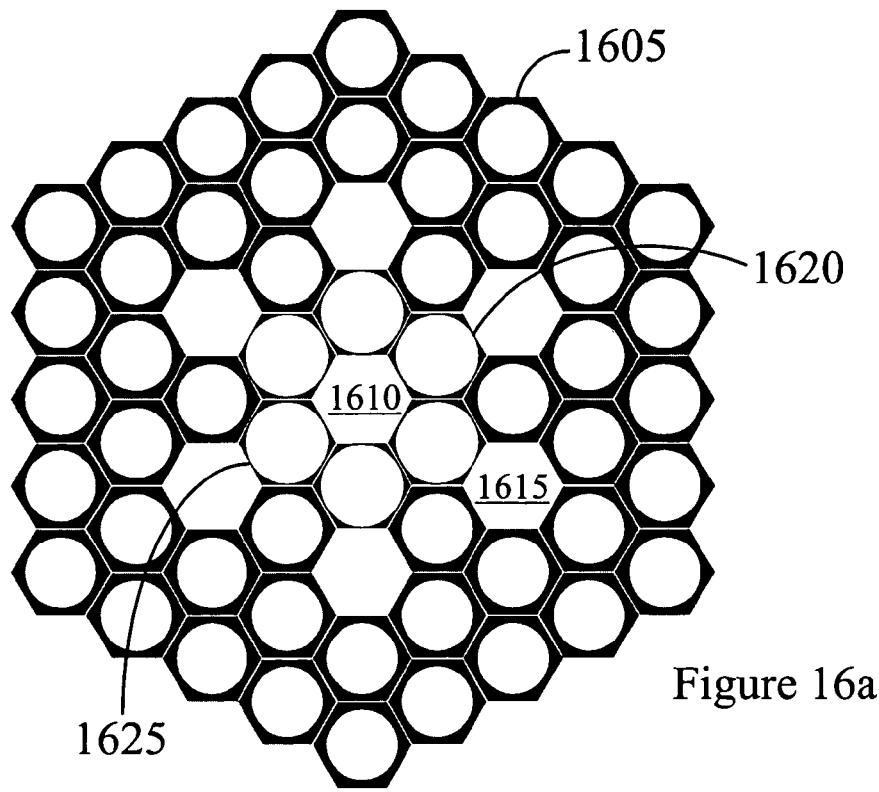

FIG. 16a is a diagram of a transverse cross section of an exemplary preform stack that can be used for making the fiber of FIG. 13a. As shown, the stack comprises an arrangement of hexagonal cross section silica capillaries 1605 each having a round bore. A capillary is omitted from the inner region 1610 and from every other region 1615 around the second layer of capillaries out from the center of the stack. In addition, the first layer of capillaries around the center of the stack comprises hexagonal capillaries 1620 having generally thinner walls, due to their bores having a larger diameter.

Figure 16B:
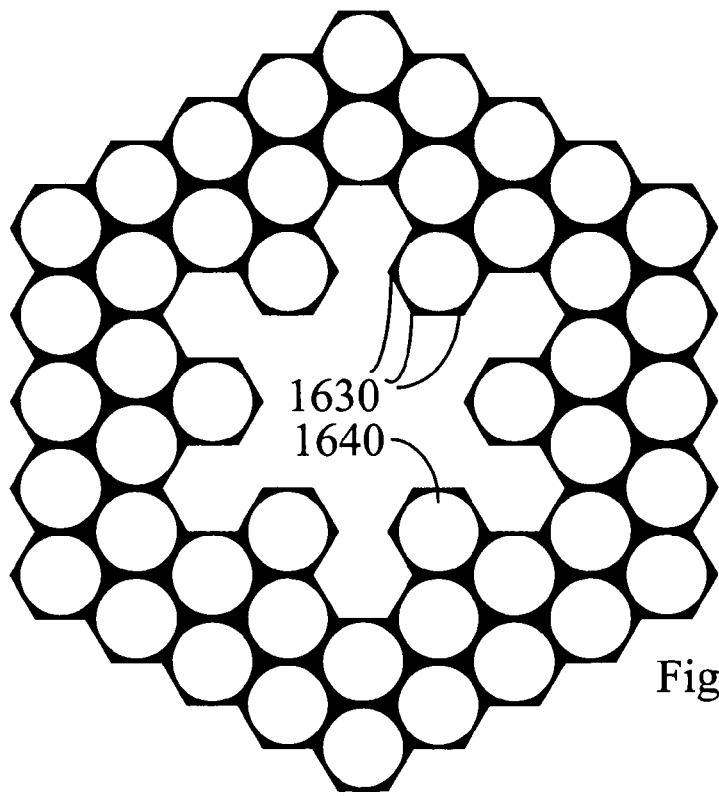

Having assembled the stack shown in FIG. 16a (which may have additional outer layers of capillaries and/or solid hexagonal rods, which are not shown), heat is applied to fuse the capillaries together into a solid preform having the same cross-sectional form as the stack. Then, the entire stack is etched by flowing a suitable etching agent through the holes of the preform. The stack is etched sufficiently so that the relatively thin-walled regions 1625, resulting from the thinner-walled capillaries, are fully removed. The result is a preform as generally illustrated in FIG. 16b.

The preform is then heated and drawn, in a fiber drawing tower, into a fiber of the kind shown in cross section in FIG. 13a. The nodules 1350 in the structure of FIG. 13a are formed by a coalescence of the three exposed corners 1630 on each of the respective inwardly-facing capillaries 1640 of the preform.

Figure 17:
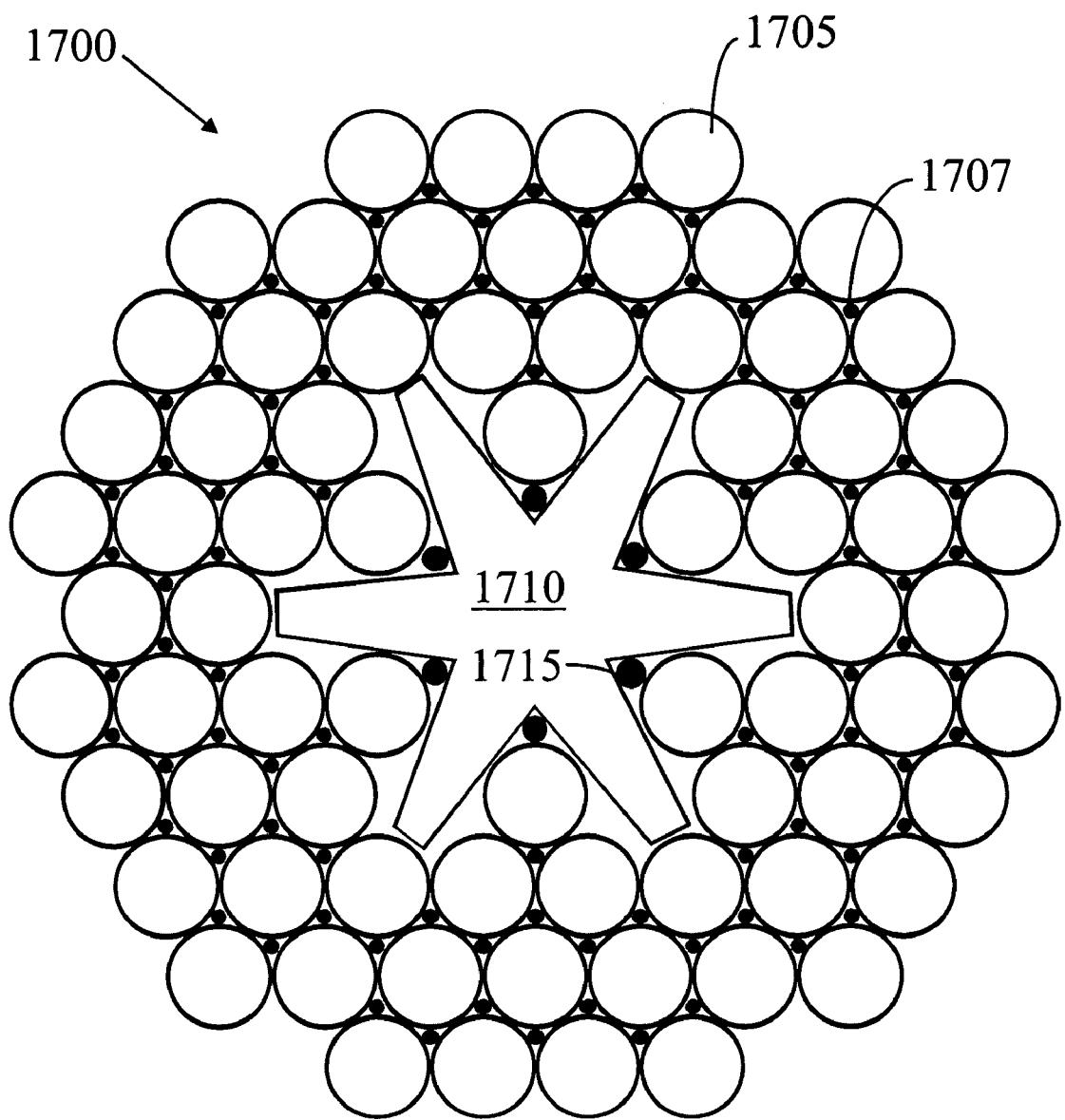

An alternative preform stack 1700 for forming the fiber structure of FIG. 13a is illustrated in the diagram in FIG. 17. This preform stack is formed from an arrangement of round cross section capillaries 1705 and small diameter rods 1707, that fit into each of the interstitial voids that form between the capillaries. An inner region of the stack is supported around an insert 1710, for example made from graphite, platinum, tungsten or a ceramic material, and which has a higher melting point than silica glass and, preferably, a higher coefficient of thermal expansion. In addition, the stack includes relatively larger cross section rods 1715 in each recess of the insert. These rods become the nodules of the resulting fiber. Use of rods in this way may also be used to form the nodules on the boundary veins of FIG. 15b.

The stack 1700, including the insert 1710, is heated to allow the capillaries 1705 and rods 1707 to fuse into a pre-form. The pre-form is then allowed to cool and the insert 1710 is removed. It will be apparent that, at this point, the core defect would take on the star shape of the insert. An advantage of using an insert material having a higher coefficient of thermal expansion than silica is that, when the pre-form and insert 1710 are heated, the insert expands and increases the area of the central region. When permitted to cool down again, the insert 1710 shrinks back down to its original size and the silica solidifies leaving an inner region that is larger than the insert. The insert, which as a result is loose-fitting in the central region, may then be removed readily from the pre-form with reduced risk of damaging or contaminating the pre-form. The resulting pre-form is then heated and drawn in the usual way to form a HC-PCF fiber. During the drawing step, it will be appreciated that the sharp corners of the core defect will, by virtue of surface tension, retract and flatten off, leaving a structure of the kind illustrated in FIG. 13a.

Figure 18A:
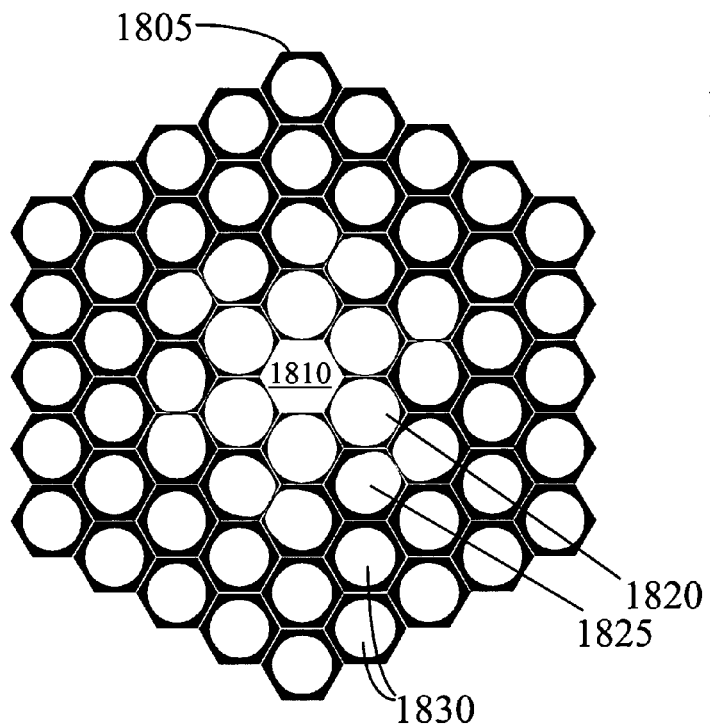
Figure 18B:
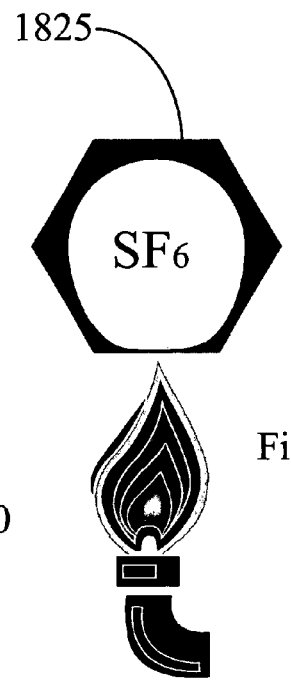
FIG. 18b is a diagram of a single hexagonal cross section element used in forming the stack.

FIG. 18a is a diagram of a preform stack suitable for making a fiber of the kind shown in transverse cross section in FIG. 15. This preform is again formed using hexagonal cross section capillaries 1805. A capillary is missing from an inner region 1810 of the stack leaving a void. The next layer out from the void comprises six capillaries 1820, around the void, each having a relatively large, round bore that renders the capillary walls relatively thin. The next layer out comprises capillaries 1825 having offset bores rendering one side of the capillary substantially thinner than the other five sides. These capillaries 1825 may be formed, as illustrated in FIG. 18b, by taking a hexagonal cross section capillary having a round bore, mounting the capillary in a lathe (not shown) and flowing a gas etching agent, such as $SF_6$, through the capillary while running a focused heat source along the wall of the capillary that is to become thinner. The etching agent preferentially removes heated material so that only the directly-heated wall becomes substantially thinner. The capillaries 1825 having offset bores are arranged so that neighbouring capillaries in the respective layer have abutting thin sides and abutting thick sides. The remaining layers 1830 of capillaries around the stack have slightly smaller bores so that their walls are relatively thinner than those of the innermost layer.

Figure 18C:
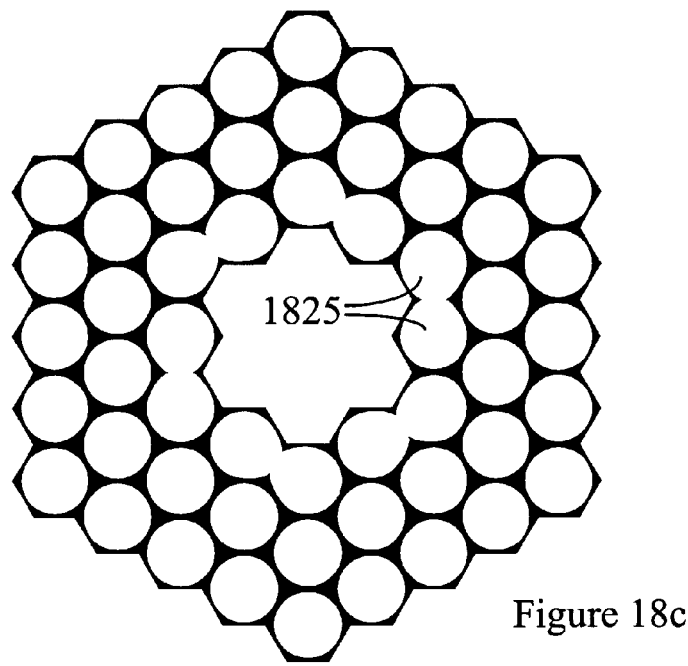

The capillary stack in FIG. 18a is heated so that the capillaries fuse into a solid preform. Then, the entire preform is etched so that the thinner regions of silica are entirely removed. The resulting preform is as shown in FIG. 18c. As shown, the abutting thinner walls of the capillaries 1825 that had offset bores have disappeared and, in effect, their respective bores have joined. This preform is then heated and drawn in the usual way to form a fiber of the kind shown in FIG. 15, which has an inner layer of larger capillaries adjacent to the core defect 1510.

Figure 19A:
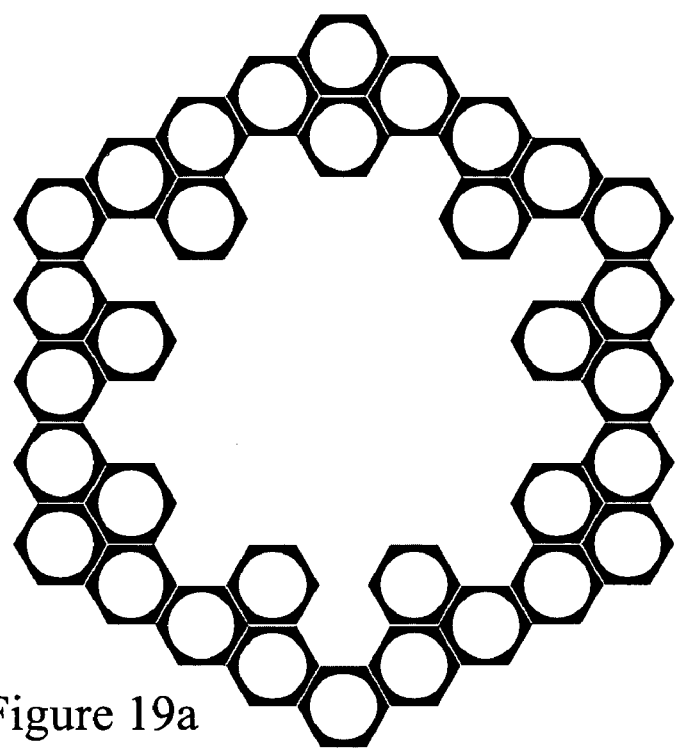
FIGS. 19a and 19b are alternative preform stacks that may be used to make HC-PCF structures according to alternative embodiments of the present invention.
Figure 19B:
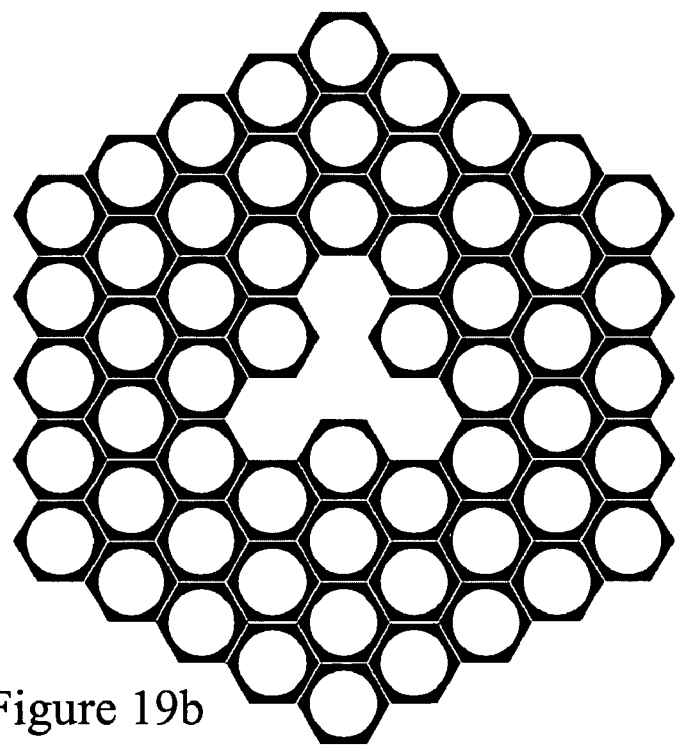

Various other HC-PCF structures may be made using either of the aforementioned stack and draw processes or other known processes. For example, the preforms shown in FIGS. 19a and 19b can be made using hexagonal cross section capillaries. The preform shown in FIG. 19a is designed to provide a fiber structure having a relatively large (28-cell) core defect region having nine lobes. The preform shown in FIG. 19b is designed to provide a fiber structure having a relatively small (4-cell) core defect region having three lobes.

On the basis of the foregoing description, the skilled person will be able to design fiber structures having either (or both) longer core defect boundary regions, compared with the largest inscribed circle that can fit within the respective core defect, or (and) an inner layer of longer-periphery holes around the core defect region.

Other possible ways of making preforms suitable for use in forming fibers according to embodiments of the present invention involve known extrusion or sol-gel forming techniques. A further alternative way to form the fiber is by using the process described in PCT/GB00/01249 (described above), wherein inner capillaries are replaced by truncated capillaries, which support the outer capillaries at either end of the stack. The stack may be drawn to an optical fiber in the normal way, and the parts of the fiber incorporating the truncated capillary material may be discarded. In principle, truncated capillaries may also be used to support the stack part way along its length.

In general, the foregoing preform stacks are drawn into fibers in more than one drawing step and, during one or more intermediate drawing steps, further over-cladding layers are added, in the form of appropriately sized tubes that are just large enough to contain the stack.

The skilled person will appreciate that while the examples provided above relate exclusively to HC-PBG fiber cladding structures comprising triangular arrays, the present invention is in no way limited to such cladding structures. For example, the invention could relate equally to square lattice structures, or structures that are not close-packed.

The skilled person will also appreciate that the structures described herein fit on a continuum comprising a huge number of different structures, for example having different combinations of core defect size, boundary vein thickness and, in general, boundary and cladding form. Clearly, it would be impractical to illustrate each and every variant of PBG waveguide structure herein. In particular, where numerical values or ranges of values are given herein for a particular parameter, all combinations with values or ranges of values of other parameters given herein are disclosed unless such combinations are not physically possible. As such, the skilled person will accept that the present invention is limited in scope only by the present claims, and equivalents thereof.

The invention claimed is:

1. A method of making an optical fiber including a cladding region, comprising an arrangement of elongate cladding holes in a matrix material, surrounding an elongate core region, comprising an elongate core hole, the method including the step of increasing the surface tension of the matrix material prior to or during the step of heating and drawing the fiber.

2. A method according to claim 1, including the step of dehydrating the matrix material in order to increase the surface tension thereof.

3. A method according to claim 2, including the step of introducing into the matrix material constituents that increase the surface tension thereof.

4. A method according to claim 1, including the step of introducing into the matrix material constituents that increase the surface tension thereof.

5. A method according to claim 4, wherein the constituents are metal oxides.

* * * * *